United States Patent
Matsui et al.

(10) Patent No.: US 12,233,950 B2
(45) Date of Patent: Feb. 25, 2025

(54) JOINT STRUCTURE AND JOINING METHOD

(71) Applicant: NIPPON STEEL CORPORATION, Tokyo (JP)

(72) Inventors: Sho Matsui, Tokyo (JP); Chisato Yoshinaga, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 885 days.

(21) Appl. No.: 17/275,863

(22) PCT Filed: Sep. 26, 2019

(86) PCT No.: PCT/JP2019/037943
§ 371 (c)(1),
(2) Date: Mar. 12, 2021

(87) PCT Pub. No.: WO2020/067331
PCT Pub. Date: Apr. 2, 2020

(65) Prior Publication Data
US 2022/0055696 A1    Feb. 24, 2022

(30) Foreign Application Priority Data

Sep. 26, 2018  (JP) ................................. 2018-180151
Sep. 26, 2018  (JP) ................................. 2018-180266

(51) Int. Cl.
*B62D 27/02*       (2006.01)
*B23K 20/12*       (2006.01)
(Continued)

(52) U.S. Cl.
CPC ........ *B62D 27/023* (2013.01); *B23K 20/1265* (2013.01); *B23K 20/127* (2013.01);
(Continued)

(58) Field of Classification Search
CPC .. B62D 27/023; B62D 29/00; B23K 20/1265; B23K 20/127; B23K 20/129; B23K 2101/006; B23K 2103/20; B23K 2103/04
See application file for complete search history.

(56) References Cited

U.S. PATENT DOCUMENTS 3,477,115 A * 11/1969 Martin ................. B23K 20/129
                                                              228/114.5
2002/0125297 A1    9/2002 Stol et al.
(Continued)

FOREIGN PATENT DOCUMENTS

JP        10-272580 A    10/1998
JP      2000-510768 A     8/2000
(Continued)

OTHER PUBLICATIONS

Viking Drill, "Drill Bit Terminology", Jun. 24, 2015, https://www.vikingdrill.com/viking-DrillBitTerms.php. (Year: 2015).*

*Primary Examiner* — Christopher W Raimund
(74) *Attorney, Agent, or Firm* — Birch, Stewart, Kolasch & Birch, LLP

(57) ABSTRACT

According to the present invention, provided are a joint structure (100) which joins a plurality of overlapped steel members (110, 120) using a connecting element (130) having a shaft portion (131), the joint structure including: a first steel member (110); and one or more of second steel members (120) overlapping the first steel member (110), in which the shaft portion (131) of the connecting element (130) is penetrated through the second steel member (120), and the shaft portion (131) of the connecting element (130) and the second steel member (120) are joined by friction welding, and the shaft portion (131) and the first steel member (110) are joined by friction welding, and a joining method for obtaining the joint structure.

13 Claims, 12 Drawing Sheets

(51) Int. Cl.
  *B23K 101/00* (2006.01)
  *B23K 103/20* (2006.01)
  *B62D 29/00* (2006.01)

(52) U.S. Cl.
  CPC ............ *B23K 20/129* (2013.01); *B62D 29/00* (2013.01); *B23K 2101/006* (2018.08); *B23K 2103/20* (2018.08)

(56) References Cited

U.S. PATENT DOCUMENTS

| | | | |
|---|---|---|---|
| 2003/0201306 A1* | 10/2003 | McTernan | B23K 20/12 228/2.1 |
| 2010/0119772 A1 | 5/2010 | Christ et al. | |
| 2011/0073258 A1 | 3/2011 | Christ et al. | |
| 2016/0263697 A1* | 9/2016 | Matsushita | C22C 38/02 |

FOREIGN PATENT DOCUMENTS

| | | |
|---|---|---|
| JP | 2007-301628 A | 11/2007 |
| JP | 2010-526666 A | 8/2010 |
| JP | 2011-62748 A | 3/2011 |
| JP | 2011-173163 A | 9/2011 |
| JP | 2015-139788 A | 8/2015 |
| WO | WO 97/44154 A1 | 11/1997 |

* cited by examiner

JOINT STRUCTURE AND JOINING METHOD

TECHNICAL FIELD OF THE INVENTION

The present invention relates to a joint structure, a joining method, and a vehicle member.

Priority is claimed on Japanese Patent Application No. 2018-180151, filed Sep. 26, 2018 and Japanese Patent Application No. 2018-180266, filed Sep. 26, 2018, the contents of which are incorporated herein by reference.

RELATED ART

In the related art, in the automotive field, spot welding has been widely used for assembling a vehicle body, attaching components, and the like, and joining of a plurality of steel sheets including a high strength steel sheet or the like is also performed by spot welding. However, in a spot welded joint including a high strength steel sheet, particularly a steel sheet having a tensile strength of 780 MPa or more, the toughness of the nugget decreases, and when stress is applied in a peeling direction, the stress concentrates on the end portion of the nugget. Therefore, despite the increase in the tensile strength of the steel sheet, there is a problem that the cross tensile strength (CTS) does not increase or decreases.

As one of the techniques for solving this problem, there is a technique for mechanically joining base metals without melting, that is, a technique using a self-piercing rivet in which a plurality of metal sheets, which are materials to be joined, are overlapped, and while the metal sheets are pressed with a retainer, a rivet is driven with a punch to join the plurality of metal sheets with the rivet. However, with this technology, since the rivet is driven, deformation of the metal sheet on the side (die side) opposite to the metal sheet that contacts the punch becomes extremely large, there is a problem that cracking occurs in the metal sheet on the die side, and in a case where tensile stress is applied in a shear direction and a peeling direction, there is a problem that the rivet comes off, fracture occurs, and sufficient values cannot be obtained in the tensile strength in the shear direction and the peeling direction.

As another technique for joining metal sheets using a connecting element having a head portion and a shaft portion like a rivet, there are techniques disclosed in Patent Documents 1 and 2. In these techniques, the connecting element is not penetrated up to the overlapped lower metal sheet, but the lower metal sheet and the connecting element are friction-welded to each other such that the upper metal sheet is fixed between the head portion of the connecting element and the lower metal sheet.

In Patent Document 1, two sheet materials having different strengths, such as an aluminum sheet and a steel sheet, are joined as follows. That is, the two sheet materials are overlapped so that the sheet material having a lower strength serves as an upper sheet 2, and as illustrated in FIG. 1, a connecting element 1 is set on the upper sheet 2 while being supported by a holder 6. Then, an engagement protrusion 5 at the tip end of a connecting element holder 4 is engaged with a recessed part 10 formed in the head portion of the connecting element 1 as illustrated in FIG. 2, and while rotating the connecting element holder 4, the connecting element holder 4 is moved toward a lower sheet 3 to apply rotation and pressing force to the connecting element 1, so that the connecting element 1 is pressed against the inside of the upper sheet 2.

Due to the rotation of the connecting element 1, strong friction is generated between a shaft portion 9 of the rivet and the upper sheet 2, and the tip end portion of the connecting element 1 is heated. Accordingly, the upper sheet 2 is softened, the connecting element 1 enters the upper sheet 2 while forming a raised portion 12, and the tip end of the connecting element 1 reaches the lower sheet 3. Thereafter, a friction welding process is advanced between the shaft portion 9 of the connecting element 1 and the lower sheet 3, such that the shaft portion 9 and the lower sheet 3 are friction-welded together, and a head portion 8 presses the raised portion 12. As a result, as illustrated in FIG. 3, the connecting element 1 and the lower sheet 3 are joined together at a friction welding portion 11, and the upper sheet 2 is fixed between the head portion 8 of the connecting element and the lower sheet 3.

The technique of Patent Document 1 as described above can solve the problem of the above-mentioned rivet joining, but is a joining technique in the case of using a light metal sheet having a lower strength than steel, such as an aluminum-based metal sheet, as a sheet material (upper sheet 2) on the side through which the connecting element is penetrated, and Patent Document 1 does not describe joining in the case of using only steel sheets.

The present inventors conducted an experiment by replacing the upper sheet 2 with a steel sheet instead of an aluminum sheet. For the steel sheet, a high pressing force of a connecting element is necessary, the amount of heat generated increases, and the connecting element itself was softened. Therefore, as illustrated in FIG. 4, the connecting element 1 could not be pressed until the tip end of the connecting element 1 reached the lower sheet 3.

Patent Document 2 describes a technique in which the upper sheet 2 is previously provided with a through-hole 13 having an inner diameter larger than the diameter of the shaft portion 9 of the connecting element as illustrated in FIG. 5, and the lower sheet 3 and the connecting element 1 are friction-welded to each other as illustrated in FIG. 6, thereby fixing the upper sheet 2 between the head portion 8 (conical disk) of the connecting element and the lower sheet 3, and is thus considered as a technique that does not need to perforate the upper sheet with the tip end of the connecting element, eliminates the problem shown in FIG. 4, and enables joining even in a case where the upper sheet is a steel sheet.

However, in this technique, unlike the technique illustrated in FIGS. 1 to 3, a gap is formed between the inner surface of the through-hole 13 and the shaft portion 9, or the inner surface of the through-hole 13 and the shaft portion 9 are not joined. Therefore, as illustrated in FIG. 7, the head portion 8 of the connecting element 1 cannot press the upper sheet 2, and there is a possibility that the upper sheet may not be fixed but be freely rotated. Furthermore, the connecting element 1 having the head portion 8 having a diameter larger than the diameter of the hole of the upper sheet 2 is required, which increases the production cost of the connecting element.

Patent Documents 3, 4, and 5 disclose joining techniques employing a friction stir process, although a joined state in a joint structure in the techniques is different from that in friction welding. In the friction stir process, for example, the joined state is obtained by intermixing the materials of a connecting element and metal sheets softened by frictional heat and plastic flow.

However, friction stir of steel members requires an expensive cemented carbide tool. When expensive cemented carbide is used as the connecting element, there is a problem that the cost required for joining becomes very high.

PRIOR ART DOCUMENT

Patent Document

[Patent Document 1] Japanese Unexamined Patent Application, First Publication No. 2011-62748
[Patent Document 2] Published Japanese Translation No. 2010-526666 of the PCT International Publication
[Patent Document 3] Japanese Unexamined Patent Application, First Publication No. 2011-173163
[Patent Document 4] Japanese Unexamined Patent Application, First Publication No. 2007-301628
[Patent Document 5] Japanese Unexamined Patent Application, First Publication No. 2015-139788

DISCLOSURE OF THE INVENTION

Problems to be Solved by the Invention

The present invention has been made in view of the above circumstances, and an object thereof is to provide a joint structure and a joining method capable of stably joining a plurality of steel members, and a vehicle member having the joint structure.

Means for Solving the Problem (1) A joint structure according to an aspect of the present invention is
a joint structure which joins a plurality of overlapped steel members using a connecting element having a shaft portion, the joint structure including:
a first steel member; and
one or more of second steel members overlapping the first steel member,
in which the shaft portion of the connecting element is penetrated through the second steel member, and the shaft portion of the connecting element and the second steel member are joined by friction welding, and
the shaft portion and the first steel member are joined by friction welding.
(2) In the joint structure according to (1),
wherein in a case where a maximum diameter of a boundary between the shaft portion and the first steel member is denoted by Dmax1, a maximum diameter of a boundary between the shaft portion and the second steel member is denoted by Dmax2, and a minimum diameter of the shaft portion at a portion more distant from the second steel member than a measurement position of the Dmax2 is denoted by Dmin,
the Dmax1 may be 0.65 times the Dmin or more, and
the Dmax2 may be 1.20 times the Dmin or more.
(3) In the joint structure according to (2),
the Dmax1 may be 0.92 times the Dmin or more.
(4) In the joint structure according to (2) or (3),
the Dmin may be 3.0 to 10.0 mm
(5) In the joint structure according to any one of (1) to (4), a total thickness of the second steel member may be 1.0 to 5.0 mm.
(6) In the joint structure according to any one of (1) to (5), the first steel member and the second steel member may have a tensile strength of 590 MPa or more.
(7) In the joint structure according to any one of (1) to (6), the connecting element may contain, as a chemical composition, by mass %:
C: 0.10% or more; and
Fe: 90% or more.
(8) In the joint structure according to any one of (1) to (7), in the connecting element, an end portion of the shaft portion which is not friction-welded to the first steel member may be provided with a head portion having a diameter larger than a diameter of the shaft portion.
(9) A joining method according to another aspect of the present invention is a joining method for obtaining the joint structure according to any one of (1) to (8), the joining method including:
preparing the first steel member and one or more of the second steel members in which a through-hole having a diameter of more than 0.60 times and not more than 1.15 times a diameter of the shaft portion is formed;
overlapping the first steel member and the second steel member so that the through-hole overlaps a point to be joined of the first steel member;
inserting the shaft portion into the through-hole, and pressing the shaft portion against the first steel member while rotating the connecting element to generate frictional heat between the shaft portion and the through-hole, and between the shaft portion and the first steel member; and
pressing the shaft portion against the first steel member in a state where the rotation of the connecting element is stopped to join the shaft portion and the through-hole, and the shaft portion and the first steel member by friction welding.
(10) In the joining method according to (9),
the diameter of the through-hole may be more than 1.00 times and not more than 1.15 times the diameter of the shaft portion.
(11) A joining method according to another aspect of the present invention is a joining method for obtaining the joint structure according to any one of (1) to (8), the joining method including:
overlapping the first steel member and one or more of the second steel members so that a point to be joined of the first steel member overlaps a point to be joined of the second steel member;
heating at least the point to be joined of the second steel member and a vicinity thereof to a preheating temperature of 400° C. or higher;
pressing the shaft portion against the second steel member while rotating the connecting element so that the shaft portion penetrates the second steel member;
pressing the shaft portion against the first steel member while rotating the connecting element to generate frictional heat between the shaft portion and the first steel member, and between the shaft portion and the second steel member; and
pressing the shaft portion against the first steel member in a state where the rotation of the connecting element is stopped to join the shaft portion and the first steel member, and the shaft portion and the second steel member by friction welding.
(12) In the joining method according to (11),
the preheating temperature may be 550° C. or higher.
(13) In the joining method according to any one of (9) to (12),
in the pressing of the connecting element against the first steel member while rotating the connecting element to generate frictional heat between the shaft portion and the first steel member, and between the shaft portion and the second steel member, a press-in length of the connecting element against the first steel member may be 2.0 mm or more.

(14) A vehicle member according to another aspect of the present invention includes the joint structure according to any one of (1) to (8).

Effects of the Invention

According to the present invention, it is possible to provide a joint structure and a joining method capable of stably joining a plurality of steel members, and a vehicle member having the joint structure.

EMBODIMENTS OF THE INVENTION

Figure 1:
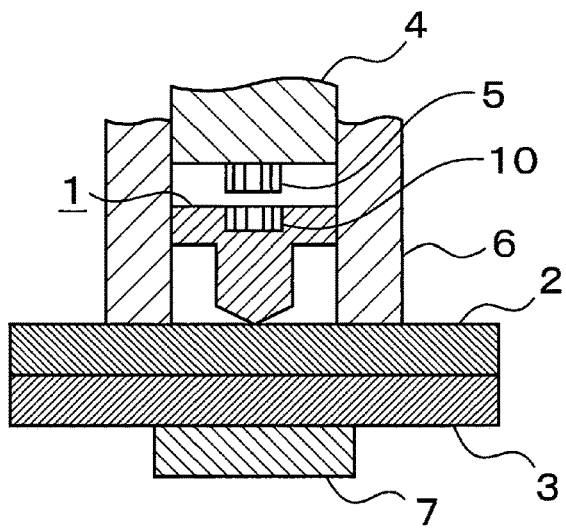
FIG. 1 is a view for describing a joining technique in the related art using a connecting element, and is a cross-sectional view of a state in which the connecting element is set in a holder of a joining apparatus (here, an engagement protrusion of a connecting element holder and a recessed part of the connecting element are illustrated in a front view seen from the outside).
Figure 2:
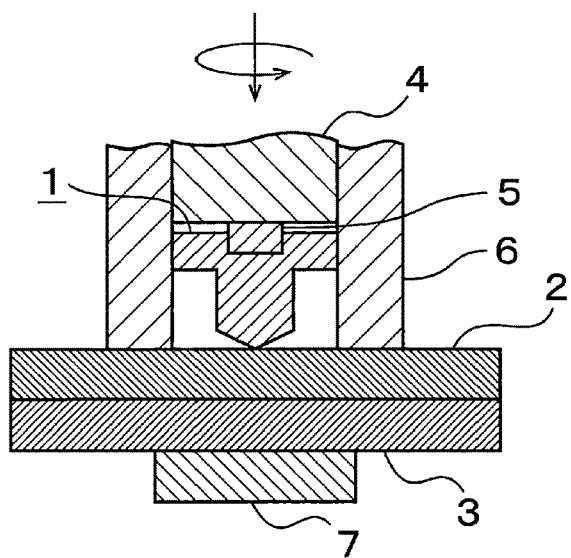
FIG. 2 is a view for describing the joining technique in the related art using the connecting element, and is a cross-sectional view illustrating a state in which the connecting element holder has started pressing the connecting element against an upper sheet.
Figure 3:
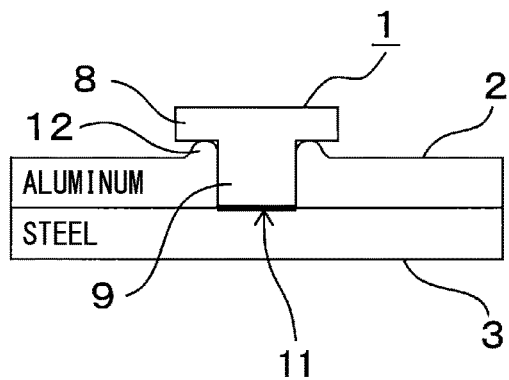
FIG. 3 is a view illustrating a state after joining by the joining technique in the related art, and is a view illustrating an example in which an aluminum material is used for the upper sheet.
Figure 4:
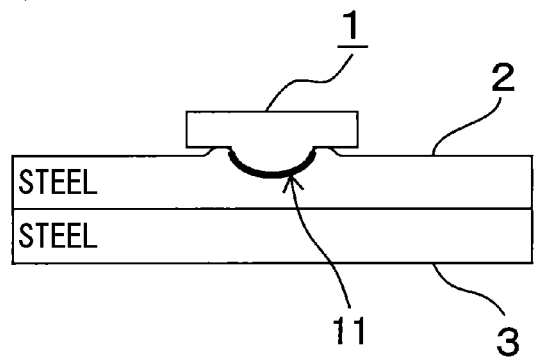
FIG. 4 is a view illustrating a state after joining by the joining technique in the related art, and is a view illustrating an example in which a steel material is used for the upper sheet.
Figure 5:
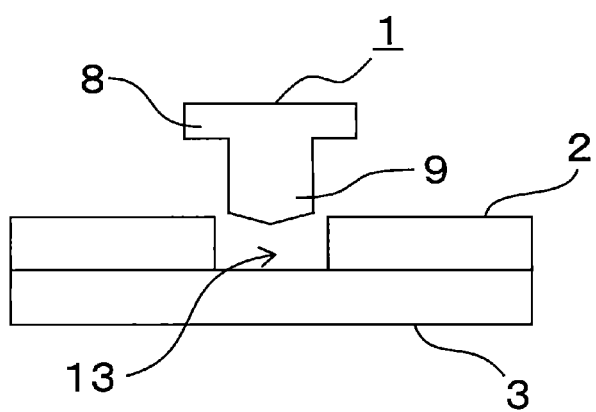
FIG. 5 is a view for describing another example of the joining technique in the related art using the connecting element.
Figure 6:
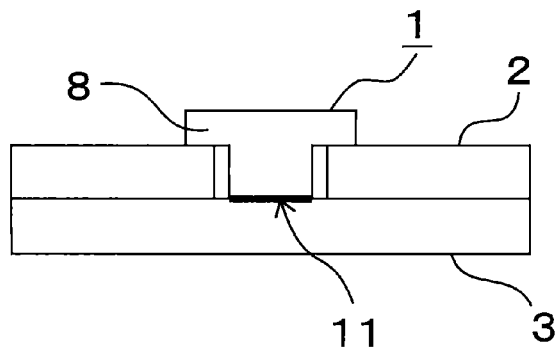
FIG. 6 is a view illustrating a state after joining according to the other example of the joining technique in the related art, and is a view illustrating an example where joining is appropriately performed.
Figure 7:
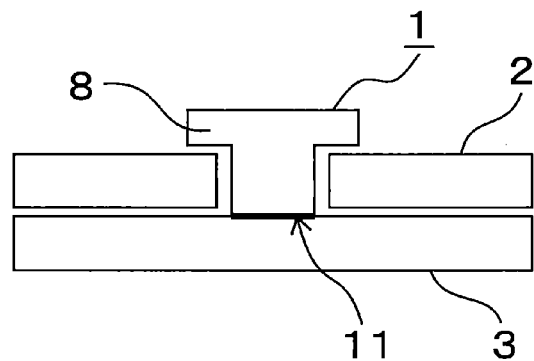
FIG. 7 is a schematic view illustrating a state after joining according to the other example of the joining technique in the related art.

Hereinafter, an embodiment of the present invention will be described with reference to the drawings. In the present specification and the drawings, like elements having substantially the same functional configuration are denoted by like reference numerals, and redundant description will be omitted.

In the present specification, the numerical range represented by "to" means the range including the numerical values before and after "to" as the lower limit and the upper limit. In the present specification, the term "step" is included in the present term not only as an independent step but also in the case where the step cannot be clearly distinguished from other steps as long as the intended purpose of the step is achieved. In addition, it is obvious that the respective elements of the following embodiments can be combined with each other.

[Joint Structure]

Next, a joint structure according to an embodiment of the present invention will be described.

Figure 8:
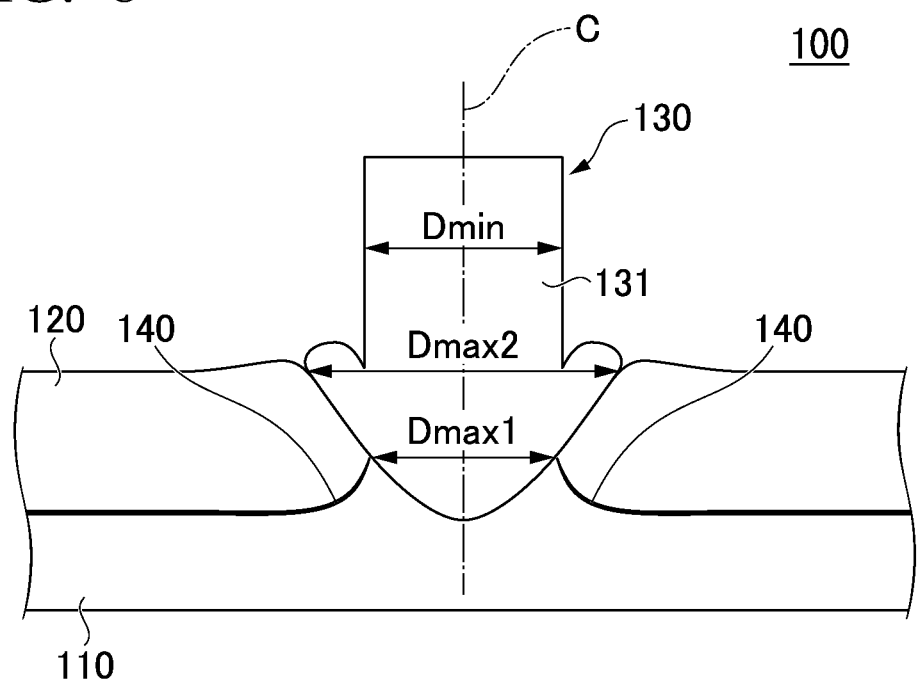
FIG. 8 is a schematic cross-sectional view for describing a joint structure according to the present embodiment.

As illustrated in FIG. 8, the joint structure according to the present embodiment is a joint structure 100 which joins a plurality of overlapped steel members (110 and 120) using a connecting element 130 having a shaft portion 131, and includes a first steel member 110 and one or more of second steel members 120 overlapping the first steel member 110, in which the shaft portion 131 of the connecting element 130 is penetrated through the second steel member 120, the shaft portion 131 of the connecting element 130 and the second steel member 120 are joined by friction welding, and the shaft portion 131 and the first steel member 110 are joined by friction welding.

In the joint structure 100 according to the present embodiment, the shaft portion 131 of the connecting element 130 and the second steel member 120 are joined by friction welding. At least a part of the shaft portion 131 of the connecting element 130 and at least a part of the second steel member 120 are joined.

In the joint structure 100 according to the present embodiment, the shaft portion 131 of the connecting element 130 and the first steel member 110 are joined by friction welding. At least a part of the shaft portion 131 of the connecting element 130 and at least a part of the first steel member 110 are joined.

The first steel member 110 and the second steel member 120 in the joint structure 100 according to the present embodiment are each joined to the connecting element 130 by the friction welding, and the first steel member 110 and the second steel member 120 are not directly joined to each other. Alternatively, even if there is a point where the first steel member 110 and the second steel member 120 are directly joined to each other, an interface 140 formed by the joining can be confirmed up to the vicinity of the shaft portion 131, as described later. Therefore, joining by friction welding is different from friction stir welding in which members to be joined are intermixed by plastic flow.

Joining by friction welding as in the joint structure 100 according to the present embodiment and joining by friction stir welding or the like can be distinguished by the following method.

The joint structure 100 including the connecting element 130, the first steel member 110, and the second steel member 120 is cut at a cross section including an axis c of the shaft portion 131 of the connecting element 130. The cut surface is etched with nital. When the etched cut surface is observed, since the degree of corrosion differs depending on the difference in composition and structure between the connecting element 130, the first steel member 110, and the second steel member 120, the boundary between the connecting element 130 and the first steel member 110 and the boundary between the connecting element 130 and the second steel member 120 can be recognized by observing the boundary lines visually (including visual observation using a magnifier or a projector) or with an optical microscope or the like.

Here, when a curve is drawn at a position 0.20 mm away from the boundary between the connecting element 130 and the first steel member 110 and the boundary between the connecting element 130 and the second steel member 120 toward the first steel member 110 or the second steel member 120 side, in a case where the interface 140 between the first steel member 110 and the second steel member 120 is confirmed on this curve, it can be determined that the first steel member 110 and the second steel member 120 are not friction-stir-welded, and in a case where the connecting element 130 is joined to the first steel member 110 and the second steel member 120, it can be determined that the joining method is friction welding.

In the case of joining by friction stir welding, the first steel member 110 and the second steel member 120 are intermixed, so that no interface between the first steel member 110 and the second steel member 120 is confirmed on the above curve.

Figure 9:
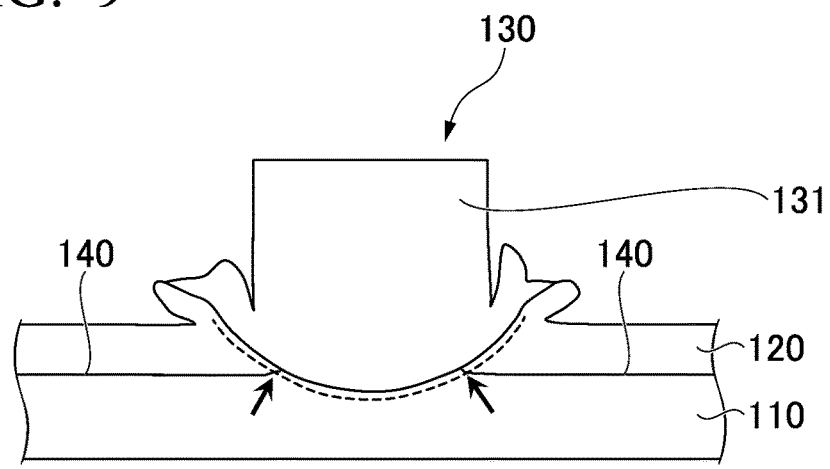
FIG. 9 is a cross-sectional view for describing the joint structure by friction welding according to the present embodiment.
Figure 10:
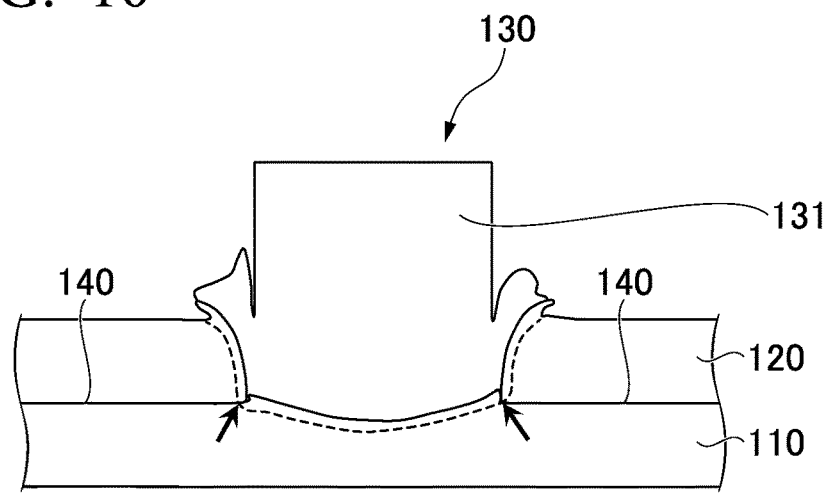
FIG. 10 is another cross-sectional view for describing the joint structure by friction welding according to the present embodiment.
Figure 11:
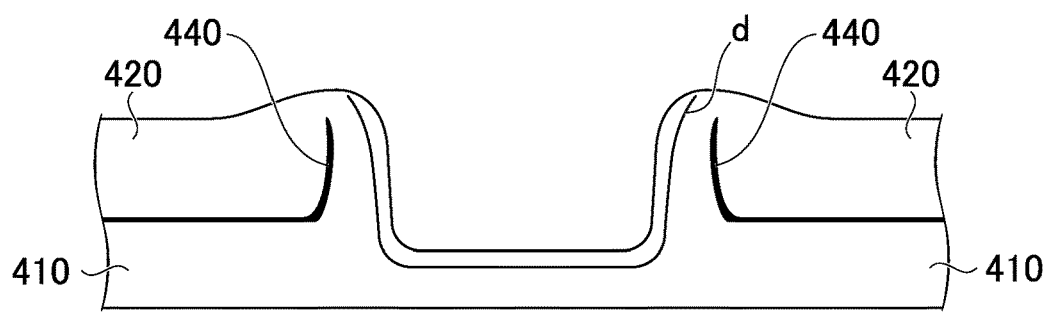
FIG. 11 is a schematic cross-sectional view for describing a joint structure joined by friction stir spot welding.

FIGS. 9 to 11 illustrate examples in which a curve is drawn at the position of 0.20 mm described above. FIG. 9 or FIG. 10 is a cross-sectional view of the joint structure by friction welding according to the present embodiment. In the example of the image of FIG. 9 or FIG. 10, a case where the first steel member and the second steel member are joined to the connecting element by friction welding is illustrated. It can be seen that the interface between the first steel member and the second steel member is present on the curve (dotted curve indicated by the arrow) in FIG. 9 or FIG. 10.

In the example of FIG. 11, unlike the joint structure 100 according to the present embodiment, a case where a first steel member 410 and a second steel member 420 are joined by friction stir spot welding. In the example of FIG. 11, since the first steel member 410 and the second steel member 420 are joined by friction stir spot welding, an interface 440 between the first steel member 410 and the second steel member 420 is not present on the above curve (curve d in FIG. 11). In the example of FIG. 11, a case where a tool made of cemented carbide is used as the connecting element is illustrated, and the shaft portion of the connecting element is not joined to the first steel member 410 and the second steel member 420. Therefore, the connecting element 130 in a removed state is illustrated.

In the joint structure 100 according to the present embodiment, in a case where the maximum diameter of the boundary between the shaft portion 131 and the first steel member 110 is denoted by Dmax1, the maximum diameter of the boundary between the shaft portion 131 and the second steel member 120 is denoted by Dmax2, and the minimum diameter of the shaft portion 131 at a portion more distant from the second steel member 120 than a measurement position of Dmax2 is denoted by Dmin, Dmax1 is 0.65 times Dmin or more, and Dmax2 may be 1.20 times Dmin or more. By satisfying this requirement, higher joint strength can be obtained. As illustrated in FIG. 8, since the diameter of the shaft portion 131 in the vicinity the second steel member 120 is largely deformed, in principle, the minimum diameter of the shaft portion 131 separated by an extent that the deformed portion can be excluded is indicated as Dmin.

Figure 12:
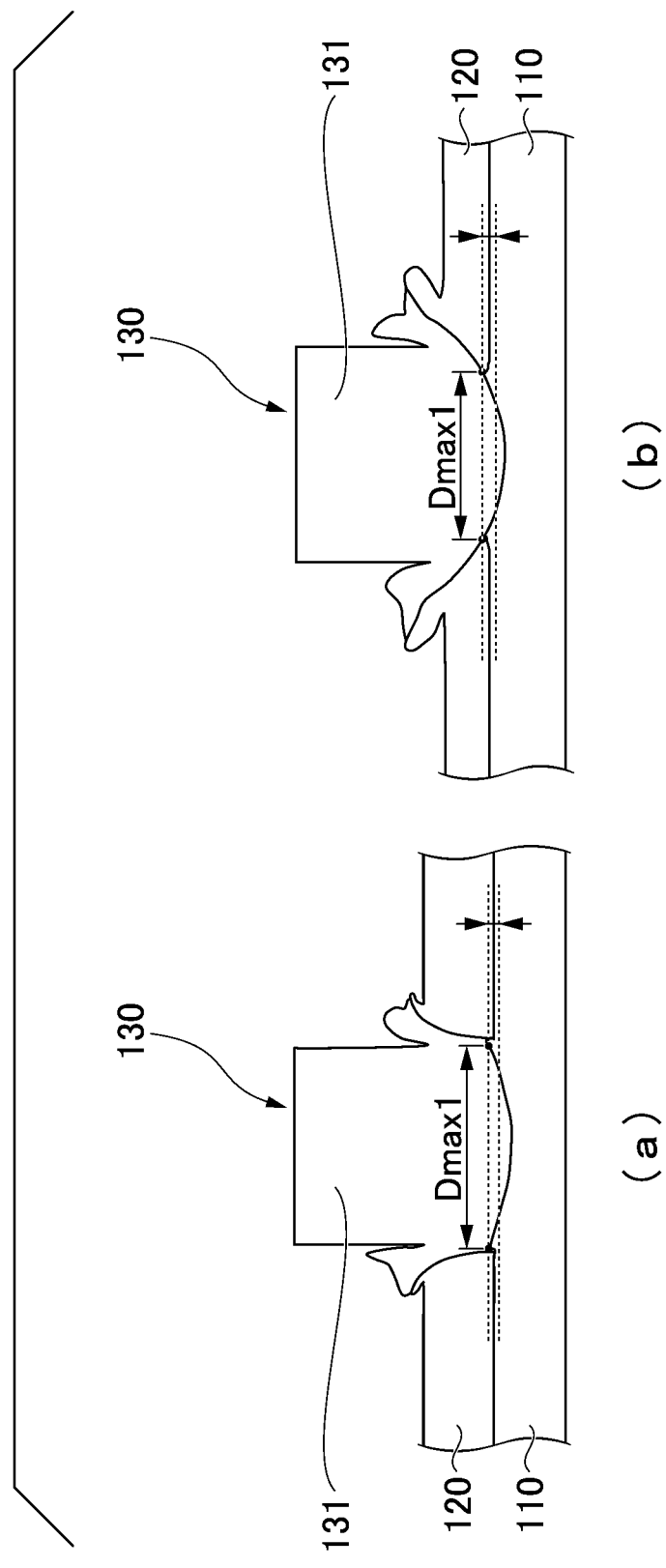
FIG. 12 is a cross-sectional view for describing Dmax1.

Since the boundary between the first steel member 110 and the second steel member 120 with respect to the connecting element 130 in the vicinity of the connecting element 130 is unclear near the shaft portion 131, there are cases where the boundary between the shaft portion 131 and the first steel member 110 is unclear. Normally, regarding the diameter of the boundary between the shaft portion 131 of the connecting element 130 and the first steel member 110, the diameter of the shaft portion 131 near the mating surface of the first steel member 110 and the second steel member 120 is the largest. Therefore, in such a case, as illustrated in FIG. 12 ((a) and (b) of FIG. 12), the maximum diameter of the shaft portion 131 within a range of 0.2 mm (the range of the arrow in FIG. 12) above and below the mating surface of the first steel member 110 and the second steel member 120 is indicated as Dmax1.

Figure 13:
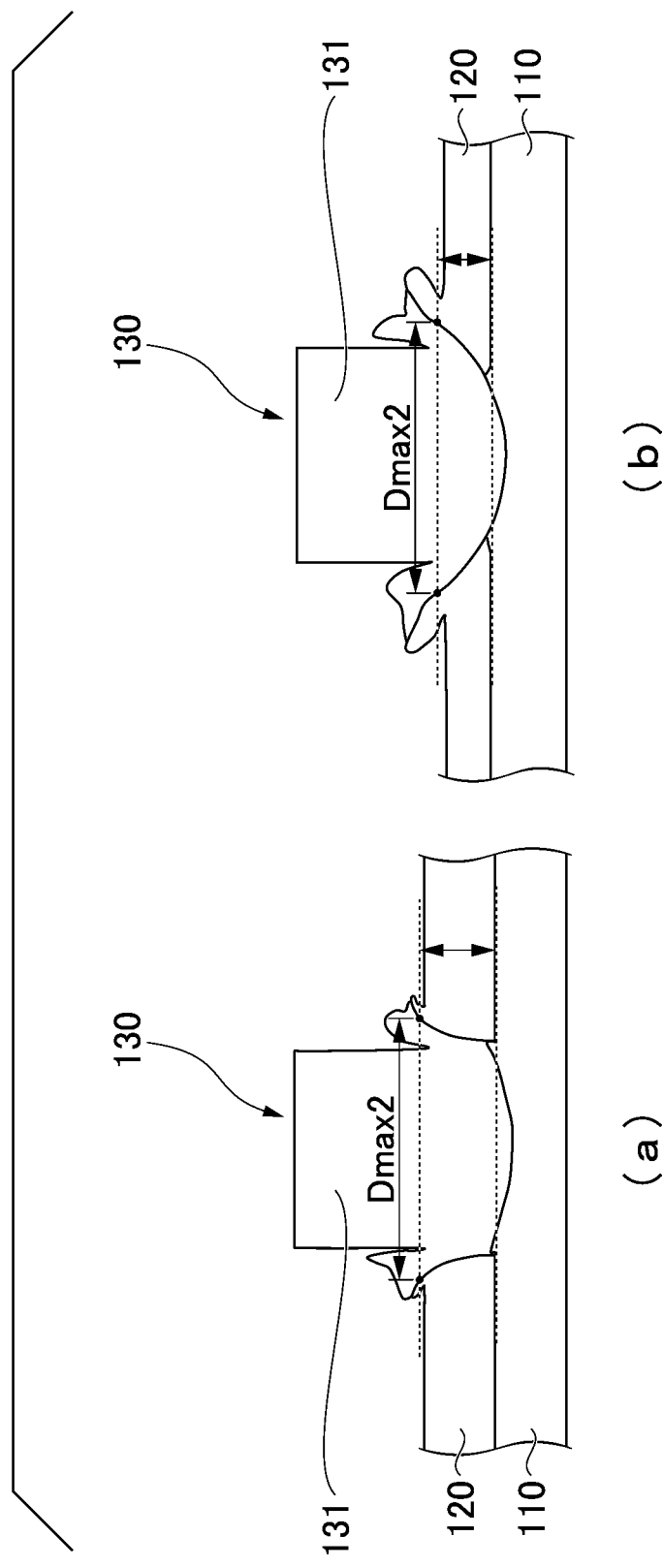
FIG. 13 is a cross-sectional view for describing Dmax2.

Furthermore, as illustrated in FIG. 13 ((a) and (b) of FIG. 13), in a case where the boundary is present at a distance of 0.2 mm or more from the upper surface of the second steel member 120 (the surface distant from the mating surface of the first steel member 110 and the second steel member 120 toward the second steel member 120 by the sheet thickness of the second steel member 120), that is, in a case where a part of the second steel member 120 is raised by 0.2 mm or more, the joint strength improvement margin due to the part raised by 0.2 mm or more is small, and thus the part raised by 0.2 mm or more (the range above the upper dotted line in FIG. 13) is excluded from the measurement target of Dmax2. That is, the measurement target range of Dmax2 is the range indicated by the arrow in FIG. 13, and the maximum diameter of the boundary between the shaft portion 131 and the second steel member 120 within that range is set to Dmax2.

However, in a case where the shaft portion 131 and the first steel member 110 are separated from each other and are not clearly joined to each other, Dmax1 is regarded as zero (0). Similarly, in a case where the shaft portion 131 and the second steel member 120 are separated from each other and are not clearly joined, Dmax2 is regarded as zero (0). Dmax1, Dmax2, and Dmin can be measured in a cross section including the axis c of the shaft portion of the connecting element 130. However, regarding Dmin, in a case where the diameter of the shaft portion 131 is known in advance, the measurement in the cross section may be omitted and the minimum diameter may be regarded as Dmin.

Regarding the joint strength between the second steel member 120 and the connecting element 130, it is considered that the larger the joint area between the second steel member 120 and the connecting element 130, the higher the joint strength between these members. The index of the joint area in that case is Dmax2 (joint diameter), and it can be said that the larger Dmax2, the higher the joint strength between the second steel member 120 and the connecting element 130. Therefore, it is preferable that Dmax2 is larger.

Further, a large Dmax2 indicates that the plastic deformation of the connecting element 130 is large. In order to perform friction welding, it is necessary that the metals to be joined are sufficiently plastically deformed with each other. When Dmax2 is 1.20 times Dmin or more, the second steel member 120 and the connecting element 130 are sufficiently friction-welded, which is more preferable. In a case where a load is applied to this joint portion (for example, the load can be reproduced by a chisel test or the like), when Dmax2 is 1.20 times or more, fracture at the joint portion between the second steel member 120 and the connecting element 130 can be suppressed, which is more preferable.

Regarding the joint strength between the first steel member 110 and the connecting element 130, the joint strength between these members is considered to increase as the joint area between the first steel member 110 and the connecting element 130 increases. That is, the larger Dmax1 which is an index of the joint area, the higher the joint strength between the first steel member 110 and the connecting element 130, which is more preferable. In a case where Dmax1 is 0.65 times Dmin or more, the joint portion during the chisel test undergoes plug fracture of the first steel member 110, partial plug fracture, or fracture in the second steel member 120, and thus can be determined as a good joint. Dmax1 may be 0.70 times Dmin or more. Accordingly, a better joint structure can be obtained.

In the joint structure according to the present embodiment, Dmax1 may be 0.92 times Dmin or more. Accordingly, higher joint strength can be obtained. Although it is not necessary to set the upper limit of Dmax1, the upper limit of Dmax1 may be 1.40 times or less, 1.30 times or less, or 1.20 times or less Dmin. Although it is not necessary to set the upper limit of Dmax2, the upper limit of Dmax2 may be 1.60 times or less, 1.40 times or less, or 1.30 times or less Dmin.

In the joint structure according to the present embodiment, the connecting element is preferably steel from the viewpoint of using inexpensive steel instead of using an expensive cemented carbide connecting element. In particular, the connecting element may contain, as the chemical composition, by mass %:

C: 0.10% or more; and
Fe: 90% or more.

In the joint structure according to the present embodiment, although it is not necessary to particularly limit the thickness of the second steel member 120, for example, the total thickness of the second steel member 120 may be set to 0.6 to 5.0 mm.

In the joint structure according to the present embodiment, although it is not necessary to particularly limit the materials, composition, and the like of the first steel member 110 and the second steel member 120, for example, the first steel member 110 and the second steel member 120 may have a tensile strength of 590 MPa or more. The shapes of the first steel member 110 and the second steel member 120 may be a plate shape, that is, the first steel member 110 and the second steel member 120 may be steel sheets.

In the joint structure according to the present embodiment, although it is not necessary to particularly specify the diameter of the shaft portion 131 (that is, Dmin), for example, the diameter of the shaft portion 131 may be set to 3.0 to 10.0 mm. If necessary, the lower limit of the diameter of the shaft portion 131 may be set to 3.5 mm or 4.0 mm. In addition, if necessary, the upper limit of the diameter of the shaft portion 131 may be set to 9.0 mm, 8.0 mm, 7.0 mm, or 6.0 mm.

The joint strength of the joint structure according to the present embodiment is strongly affected by the diameter of the connecting element 130. Therefore, it is preferable to select the diameter of the shaft portion 131 in accordance with the smaller thickness of the thickness of the first steel member 110 and the total thickness of the second steel member 120. For example, the diameter of the shaft portion 131 may be set to $3\times\sqrt{\text{(the smallest thickness of the first steel member and the second steel member)}}$ or more. Furthermore, it is preferable that the shaft portion 131 does not have a necking part or a recessed part in order to prevent unexpected buckling at the time of pressurization. The shaft portion 131 may have a cylindrical shape, but in order to more effectively cause the shaft portion 131 to penetrate the second steel member 120, the tip end portion thereof has a conical shape or a polygonal pyramid shape whose diameter decreases toward the tip end. Furthermore, it is preferable that the diameter of the shaft portion 131 disposed on the first steel member 110 side is equal to or less than the diameter disposed on the second steel member 120 side.

In the joint structure according to the present embodiment, a portion of the connecting element 130 adjacent to the shaft portion 131 which is not friction-welded to the first steel member 110 may be further provided with a head portion having a diameter larger than the diameter of the shaft portion 131. In particular, the joint strength can be further increased by making the diameter of the head portion larger than the inner diameter of a through-hole 221, which will be described later, formed in the second steel member. However, in the joint structure according to the present embodiment, since the first steel member 110 and the second steel member 120 are each joined to the connecting element 130, the head portion of the connecting element is not essential. That is, the head portion having a diameter larger than the diameter of the shaft portion 131 may be absent.

The joint structure according to the above-described embodiment can be preferably used as a vehicle member. The vehicle member having the joint structure according to the above-described embodiment has high strength and can suppress the occurrence of cracking in the vicinity of the friction welding surface of the joint portion.

Next, a joining method according to an embodiment of the present invention will be described. The embodiment according to the joining method described below is merely an example for obtaining the above-described joint structure.

[Joining Method 1]

The joining method according to the present embodiment includes: preparing a first steel member and one or more of second steel members in which a through-hole having a diameter of more than 0.60 times and not more than 1.15 times the diameter of a shaft portion is formed; overlapping the first steel member and the second steel member so that the through-hole overlaps a point to be joined of the first steel member; inserting the shaft portion into the through-hole, and pressing the shaft portion against the first steel member while rotating the connecting element to generate frictional heat between the shaft portion and the through-hole, and between the shaft portion and the first steel member; and pressing the shaft portion against the first steel member in a state where the rotation of the connecting element is stopped to join the shaft portion and the through-hole, and the shaft portion and the first steel member by friction welding.

Figure 14:
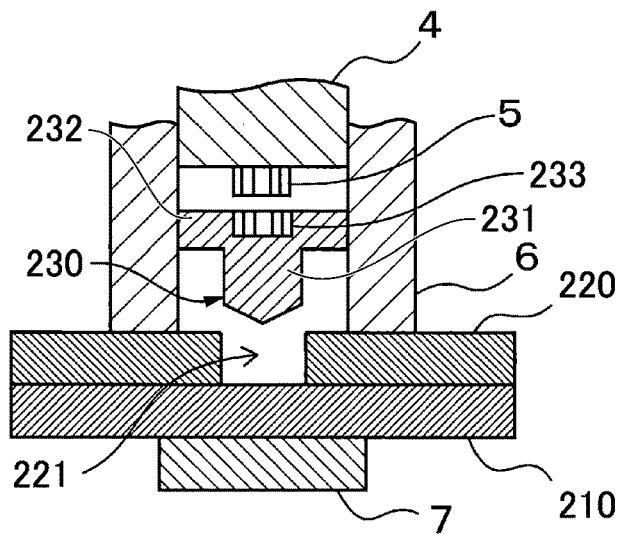
FIG. 14 is a view for describing a joining technique of the present invention using a connecting element, and is a cross-sectional view of a state in which the connecting element is set in a holder of a joining apparatus (here, an engagement protrusion of a connecting element holder and a recessed part of the connecting element are illustrated in a front view seen from the outside).

In the joining method according to the present embodiment, as schematically illustrated in FIG. 14, a joining apparatus in which the connecting element holder 4 having the engagement protrusion 5 at the tip end to be engaged with a connecting element 230 so as to rotate and feed the connecting element 230, and the cylindrical holder 6 provided coaxially with the connecting element holder on the outside of the connecting element holder 4 are disposed on one side, and a support base 7 which supports a first steel member 210 and a second steel member 220 to be joined to each other, against the connecting element holder 4 is provided on the other side may be used. Furthermore, in the following embodiments, an example in which each steel member is a steel sheet will be described.

In addition, as illustrated in FIG. 14, for example, the connecting element 230 for connecting the overlapped steel sheets includes a shaft portion 231 and a head portion 232 having a diameter larger than that of the shaft portion 231, as in a general rivet, and the head portion 232 may have a recessed part 233 fitted to the engagement protrusion 5. Alternatively, a connecting element with the head portion 232 and the shaft portion 231 having the same diameter, that is, only having the shaft portion 231 without the head portion 232 may be used. In this case, the upper end portion of the shaft portion 231 has the recessed part 233 fitted to the engagement protrusion 5 of the connecting element holder 4.

Joining is performed in the following procedure using the above-mentioned device. In addition, regarding the first steel member 210 and the second steel member 220 that are overlapped with each other, there are cases where a steel sheet serving as a base located on the side opposite to the side where the connecting element 230 is inserted is referred to as a lower sheet (first steel member 210), and one or two or more steel sheets overlapping the steel sheet are referred to as an upper sheet (second steel member 220). Here, an example in which the number of the second steel members 220 is one will be described.

a) The second steel member 220 and the first steel member 210 to be joined are overlapped and placed on the support base 7 of the joining apparatus (see FIG. 14). In a case where the first steel member 210 and the second steel member 220 have different tensile strengths, it is preferable that the steel sheet having the lower tensile strength is the second steel member 220. A through-hole 221 is formed in advance in a point (point to be joined) of the second steel member 220 to be joined by the connecting element 230, and the steel sheets are set so that the center of the through-hole 221 coincides with the center of the holder 6. The inner diameter (diameter) of the through-hole 221 is set to more than 0.60 times and not more than 1.15 times the diameter of the shaft portion 231 of the connecting element 230.

Figure 15:
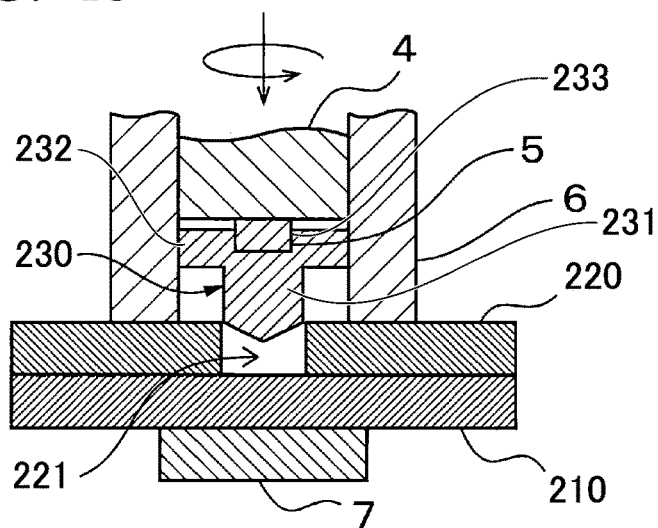
FIG. 15 is a view for describing the joining technique of the present invention using the connecting element, and is a cross-sectional view of a state in which the connecting element holder has started inserting the connecting element into a through-hole of a second steel member.

The first steel member 210 and the second steel member 220 placed on the support base 7 are held between the holder 6 and the support base 7, and the connecting element 230 is set in the holder 6 (see FIG. 14). Hereinafter, as the connecting element 230, an example in which the connecting element 230 having the shaft portion 231 and the head portion 232 having a larger diameter than the shaft portion 231 on one side of the shaft portion 231 is used will be described. In addition, a case where the number of second steel members to be overlapped is three or more is also included, and a through-hole is formed in advance in each of the second steel members.

b) Next, the engagement protrusion 5 at the tip end of the connecting element holder 4 is engaged with the recessed part 233 of the head portion 232 of the connecting element 230 (in the case of the connecting element 230 without the head portion 232, the engagement protrusion 5 is engaged with the recessed part 233 processed in the upper portion of the shaft portion 231, or the side surface of the shaft portion 231 is held by a hydraulic chuck or the like), and the tip end of the connecting element 230 is moved to the inlet of the through-hole 221 of the second steel member 220 through the inside of the holder 6 while rotating the connecting element holder 4 (see FIG. 15).

c) The connecting element 230 is further pressed while being rotated by the connecting element holder 4 such that the connecting element 230 is allowed to enter the through-hole 221 and the tip end portion thereof is brought into contact with the first steel member 210. At that time, in a case where the inner diameter (through-hole diameter) of the through-hole 221 is smaller than the diameter (shaft diameter) of the shaft portion 231 of the connecting element 230, after the tip end of the connecting element 230 comes into contact with the second steel member 220, the rotation speed of the connecting element holder 4 and the pressing force against the connecting element 230 are adjusted such that frictional heat is generated between the shaft portion 231 of the connecting element 230 and the inner wall of the through-hole 221 as the connecting element 230 enters the through-hole 221 and the material around the through-hole 221 of the second steel member 220 is caused to flow. At this time, a raised portion 222 may be formed on the surface of the second steel member 220.

d) After the tip end of the shaft portion 231 of the connecting element 230 reaches the first steel member 210, frictional heat is also generated between the tip end portion of the connecting element 230 and the first steel member 210. At this time, the rotation speed of the connecting element holder 4 is increased to apply a sufficient welding pressure so that a temperature at which friction welding can be performed between the tip end portion of the shaft portion 231 of the connecting element 230 and the first steel member 210, and between the shaft portion 231 of the connecting element 230 and the inner wall of the through-hole 221 of the second steel member 220 is reached, and the diameter of the shaft portion 231 is increased.

Figure 16:
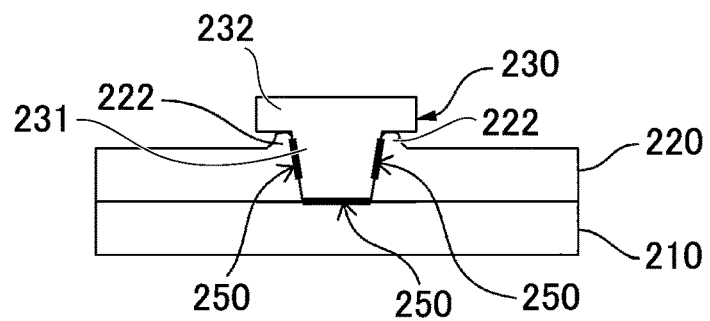
FIG. 16 is a view illustrating a state after joining according to the present invention, and illustrates an example in which joining is appropriately performed.

Even in a case where the diameter of the through-hole 221 is larger than the shaft diameter, when the shaft portion 231 is pressed against the first steel member 210, the shaft portion 231 is deformed, the diameter of the shaft portion 231 increases, and the shaft portion 231 and the inner wall of the through-hole 221 of the second steel member 220 come into contact with each other, whereby frictional heat is generated, and the shaft portion 231 and the inner wall of the through-hole 221 are partially friction-welded to each other. When the inner diameter of the through-hole 221 is 1.15 times or less the diameter of the shaft portion 231, the above phenomenon occurs.

e) When the shaft portion 231 of the connecting element 230 and the portions of the first steel member 210 and the second steel member 220 are sufficiently heated, the rotation of the connecting element holder 4 is stopped and pressurization is held for a certain period of time (for example, 0.5 seconds or longer), whereby friction welding portions 250 are formed on at least a part between the shaft portion 231 of the connecting element 230 and the inner wall of the through-hole 221 and between the shaft portion 231 and the first steel member 210 and the shaft portion 231 of the connecting element 230 is joined to the second steel member 220 and the first steel member 210 (see FIG. 16).

Figure 17:
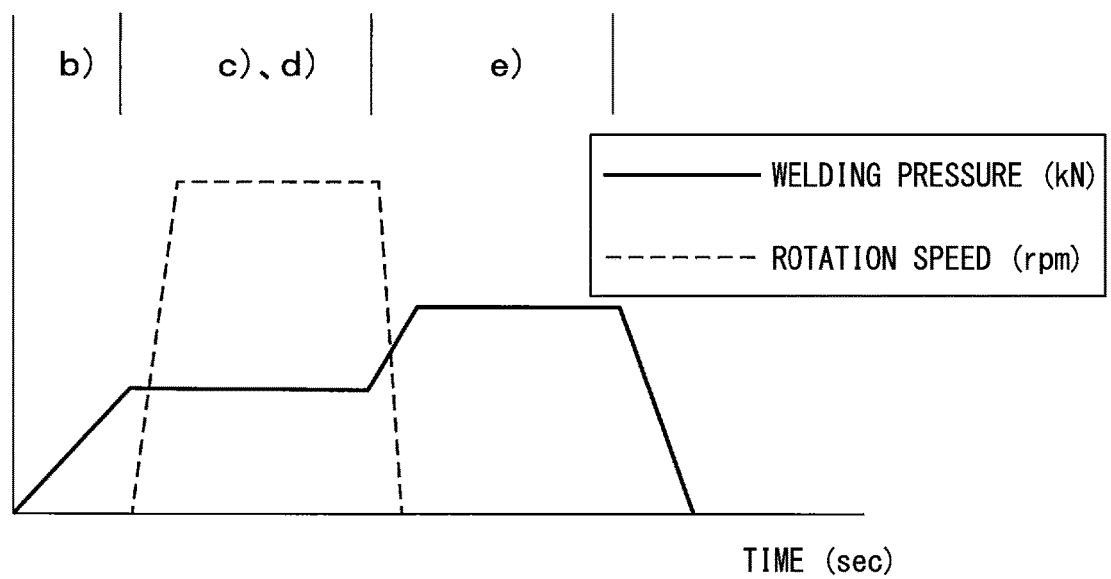
FIG. 17 is a view illustrating an example of a time pattern of a welding pressure and a rotation speed of the connecting element holder used in a joining method of the present invention.

FIG. 17 shows an example of a time pattern of the rotation speed and the welding pressure of the rotation processing member in the above stages b) to e). The pattern of the rotation speed indicated by the dotted line is constant between c) and d) in FIG. 17, but a pattern in which the rotation speed changes may be appropriately adopted. In addition, the welding pressure (also referred to as pressing force) indicated by the solid line is high in e), but for example, a constant welding pressure may be provided in c), d), and e).

In the stage c) in the case where the diameter of the through-hole 221 is smaller than the diameter (shaft diameter) of the shaft portion 231 of the connecting element 230, the rotation speed is set to about 1000 rpm (for example, 800 to 1500 rpm), and in the stage d) in which the tip end of the shaft portion 231 of the connecting element 230 reaches the first steel member 210, the rotation speed is preferably set to 5000 to 8000 rpm. On the other hand, in friction stir welding, the rotation speed (including the final stage of joining) is several hundreds to 1500 rpm, which is also different from the friction welding. Therefore, in a case where the joint structure obtained by the friction welding is cut in a cross section including the axis c of the shaft portion 231 at a joint structure portion and etched with nital, the boundary between second steel member 220 and the first steel member 210 is present up to a position 0.20 mm away from the shaft portion 231.

Figure 18:
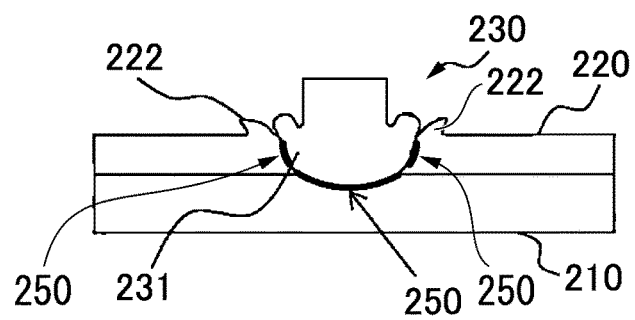
FIG. 18 is a schematic view illustrating a state after joining according to the present invention.

As a result, in the connecting element 230, at least a part of the shaft portion 231 is friction-welded to the second steel member 220, and the tip end of the shaft portion 231 is friction-welded to the first steel member 210. Accordingly, even in a case where the head portion 232 and the second steel member are not brought into contact with each other due to insufficient press-in amount of the connecting element 230 or in a case where the connecting element does not have the head portion, since the connecting element 230 and the second steel member 220 are joined to each other at the friction welding portion 250 as illustrated in FIG. 18, the second steel member 220 does not rotate freely.

In addition, in a case where the second steel member is a light metal as in Patent Document 1, the contact portion with the connecting element is melted or softened, and the difference in strength from the connecting element becomes excessive, so that no friction welding portion is formed in the second steel member.

The diameter of the through-hole 221 formed in the second steel member 220 is preferably set to 0.60 to 1.15 times the diameter (shaft diameter) of the shaft portion 231 of the connecting element 230 depending on the thickness and strength of the second steel member 220 so that the temperature at which the connecting element 230 and the second steel member 220 can be friction-welded to each other is reached. When the diameter is less than 0.60 times, there is concern that it may be difficult for the connecting element 230 to penetrate the second steel member 220. When the diameter exceeds 1.15 times, there is concern that it may be difficult to achieve friction welding between the outer circumference of the connecting element 230 and the second steel member 220. For example, in a case where the second steel member is a plurality of steel sheets, all the second steel members are provided with a through-hole.

In the joining method according to the present embodiment, the diameter of the through-hole 221 may be more than 1.00 times and not more than 1.15 times the diameter of the shaft portion 231. Accordingly, the welding pressure of the connecting element 230 can be reduced, which is particularly preferable in a case where the second steel member 220 is a high strength steel sheet.

In a case where the second steel member 220 is provided with through-hole 221, the larger the diameter of the through-hole 221, the easier the Dmax1 is to expand. In particular, in a case where the through-hole 221 having a diameter of more than 1.00 times and not more than 1.15 times the diameter of the connecting element 230 is provided, the friction welding of the first steel member 210 and the connecting element 230 is achieved and then Dmax1 can stably become 0.65 times Dmin or more, so that a good result is achieved in the result of a chisel test. Furthermore, in a case where the through-hole 221 having a diameter of not less than 1.05 times and not more than 1.15 times the diameter of the connecting element 230 is provided, Dmax1 can stably become 0.92 times Dmin or more, so that the joint strength can be increased. The upper limit of the ratio between the diameter of the connecting element 230 and the diameter of the through-hole 221 is 1.15, and may be 1.12 times or 1.09 times, if necessary.

In the above joining method, it is more preferable that the press-in length 1$i$ when the shaft portion 231 is penetrated through the through-hole 221 of the second steel member 220 and the shaft portion 231 is pressed against the first steel member 210 is 2.0 mm or more. The press-in length 1$i$ is more preferably 2.3 mm or more or 2.5 mm or more. By setting the press-in length 1$i$ in this manner, the maximum diameter Dmax2 of the boundary between the shaft portion 231 and the second steel member 220 becomes 1.20 times Dmin or more, which is more preferable.

In addition, it is not easy to measure the actual press-in length of the connecting element 230 against the first steel member 210. Therefore, in the present embodiment, the press-in length 1$i$ is set to a value obtained by subtracting the total thickness of the second steel member 220 from the amount of movement of the connecting element 230 from when the tip end portion of the connecting element 230 reaches the upper surface of the second steel member 220 to the end of joining in the direction along the axis c of the connecting element 230. The amount of movement of the connecting element 230 is the same as the amount of vertical movement of the member that supports the connecting element holder 4 in FIG. 14 and the like, and can be easily measured. The press-in length 1$i$ can also be referred to as an estimated press-in length.

[Joining Method 2]

Another joining method according to the present embodiment includes: overlapping a first steel member and one or more of the second steel members so that a point to be joined of the first steel member overlaps a point to be joined of the second steel member; heating at least the point to be joined of the second steel member and a vicinity thereof to a preheating temperature of 400° C. or higher; pressing the shaft portion against the second steel member while rotating the connecting element so that the shaft portion penetrates the second steel member; pressing the shaft portion against the first steel member while rotating the connecting element to generate frictional heat between the shaft portion and the first steel member, and between the shaft portion and the second steel member; and pressing the shaft portion against the first steel member in a state where the rotation of the connecting element is stopped to join the shaft portion and the first steel member, and the shaft portion and the second steel member by friction welding.

Figure 19:
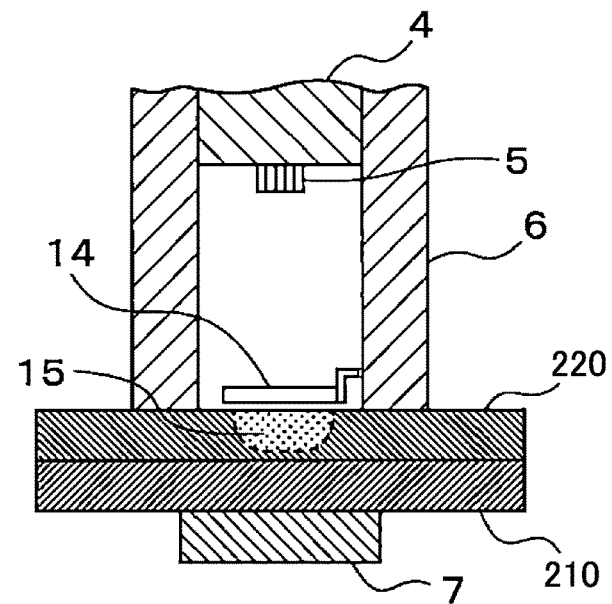
FIG. 19 is a view for describing an example of the joining technique of the present invention using the connecting element, and illustrates a state of a preheating stage of a steel sheet.
Figure 20:
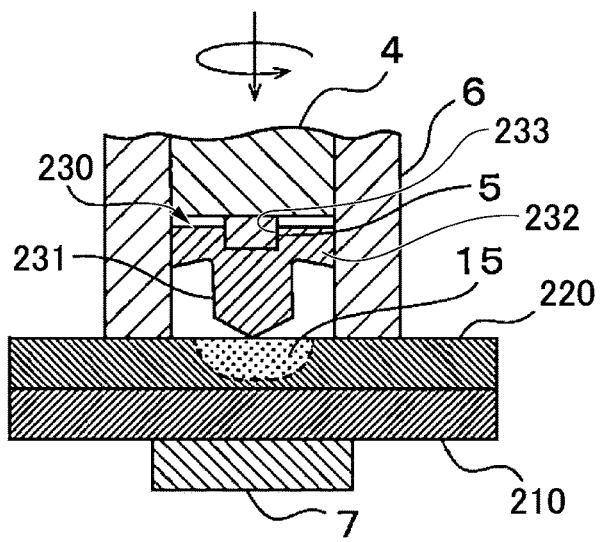
FIG. 20 is a view for describing an example of the joining technique of the present invention using the connecting element, and illustrates a state at the time of starting joining of steel sheets.

In the joining method according to the present embodiment, joining is performed in the following procedure using the above-described joining apparatus. The basic configuration is the same as in the above-described joining method.

a) The second steel member 220 and the first steel member 210 to be joined are overlapped, placed on the support base 7 of the joining apparatus so that a point into which the connecting element 230 is press-fitted (point to be joined) is the center of the holder 6, and held between the holder 6 and the support base 7 (see FIG. 19). In a case where the two steel members have different tensile strengths, it is preferable that the steel member having the lower tensile strength is the second steel member 220 located on the holder 6 side.

b) Next, a heating device 14 is disposed above the point to be joined of the second steel member 220 to heat the point to be joined and the vicinity thereof (see FIG. 19). The heating is performed so that the surface temperature of the point to be joined becomes 400° C. or higher at the start of joining. FIG. 19 schematically illustrates a range heated to a predetermined temperature or higher as a heated portion 15. As the heating device 14, for example, an annular induction heating coil is used.

c) When the surface temperature of the second steel member 220 reaches the predetermined temperature, the heating device 14 is retracted, and the connecting element 230 is set in the holder 6 appropriately. The connecting element 230 may be set on the upper side in the holder in the stage a). Next, the connecting element holder 4 is moved toward the second steel member 220 side through the holder 6, and the engagement protrusion 5 at the tip end of the connecting element holder 4 is engaged with the recessed part 233 of the head portion 232 of the connecting element 230 (see FIG. 20).

Figure 21:
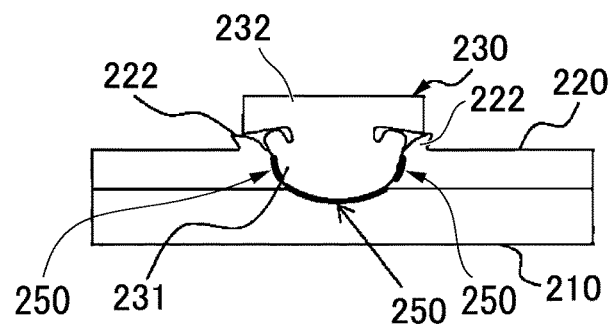
FIG. 21 is a view illustrating an example of a state after joining according to the present invention, and illustrates an example in which joining is appropriately performed.
Figure 22:
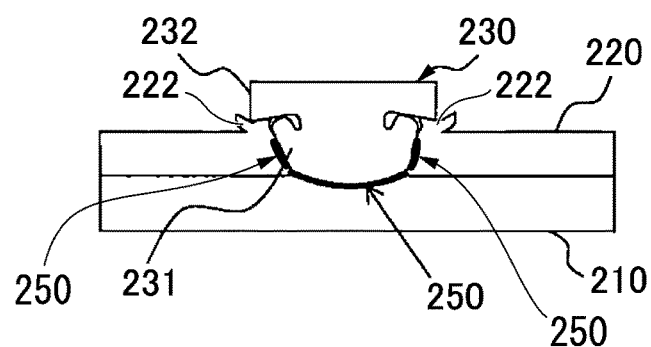
FIG. 22 is a view illustrating an example of a state after joining according to the present invention, and illustrates an example in which a press-in amount is large.

Then, by rotating the connecting element holder 4, the second steel member 220 is pressurized while rotating the connecting element 230, and the shaft portion 231 of the connecting element 230 is press-fitted into the second steel member 220 and penetrated through the second steel member 220 such that the tip end portion thereof is brought into contact with the first steel member 210. At that time, after the tip end of the connecting element 230 comes into contact with the second steel member 220, the rotation speed of the connecting element holder 4 and the welding pressure applied to the connecting element 230 are adjusted such that frictional heat is generated between the shaft portion 231 and the second steel member 220 as the shaft portion 231 of the connecting element 230 is press-fitted into the second steel member 220 and the material of the portion of the second steel member 220 that is brought into contact with the connecting element and the periphery thereof is caused to flow. At this time, a raised portion 222 may be formed on the surface of the second steel member 220.

d) After the tip end of the connecting element 230 reaches the first steel member 210, frictional heat is also generated between the tip end portion of the connecting element 230 and the first steel member 210. At this time, the welding pressure and the rotation speed of the connecting element holder 4 are maintained so that a temperature at which friction welding can be performed between the tip end portion of the shaft portion 231 of the connecting element 230 and the surface of the first steel member 210 that is in contact therewith is reached.

e) When the shaft portion 231 of the connecting element 230 and the first steel member 210 are sufficiently heated, the rotation of the connecting element holder 4 is stopped and pressurization is held for a certain period of time (for example, 0.5 seconds or longer), whereby the friction welding portions 250 are formed between the shaft portion 231 of the connecting element 230 and the first steel member 210 and between the shaft portion 231 and the second steel member 220 and the shaft portion 231 of the connecting element 230 is joined to the second steel member 220 and the first steel member 210 as illustrated in FIG. 21 or FIG. 22. In addition, during the rotation of the connecting element holder 4 or after the rotation is stopped, the press-in amount (press-in length) of the connecting element 230 by the connecting element holder 4 may be adjusted so that the raised portion 222 of the second steel member 220 is pressed by the head portion 232 (the peripheral portion of the connecting element 230 receives sufficient compressive stress between the head portion 232 and the first steel member 210) as illustrated in FIG. 22.

Figure 23:
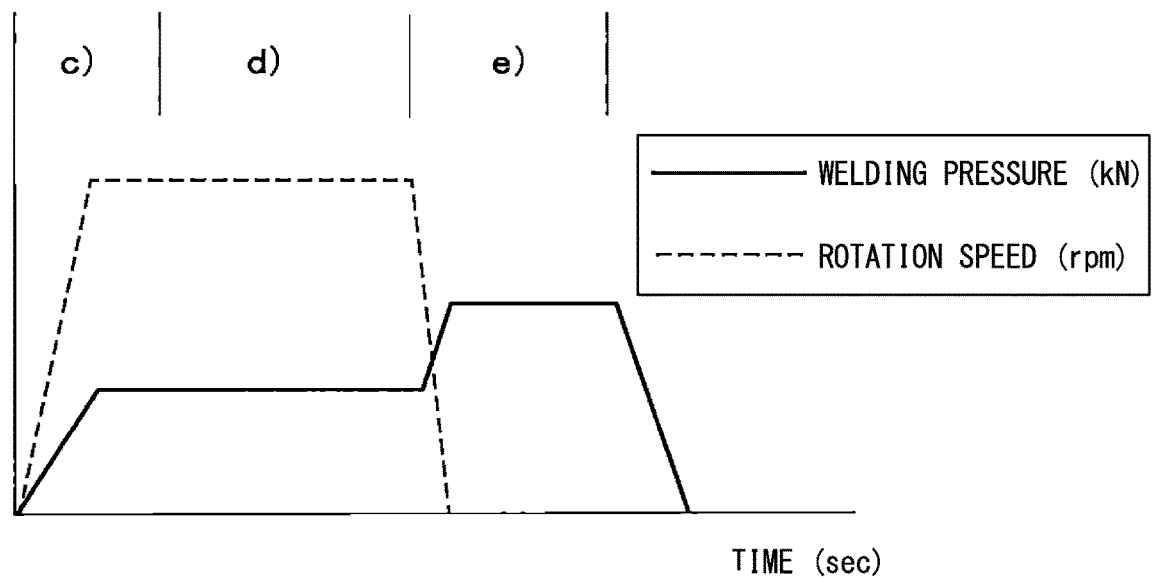
FIG. 23 is a view illustrating an example of a time pattern of the welding pressure and the rotation speed of the connecting element holder used in the joining method of the present invention.

FIG. 23 shows an example of a time pattern of the rotation speed and the welding pressure of the connecting element holder in the above stages c) to e). The pattern of the rotation speed indicated by the dotted line is constant between c) and d) in FIG. 23, but a pattern in which the rotation speed changes may be appropriately adopted. In addition, the welding pressure indicated by the solid line is high in e), but for example, a constant welding pressure may be provided in c), d), and e).

In the stage of press-fitting the shaft portion 231 into the second steel member 220 in c) to be penetrated through the second steel member 220, the rotation speed is set to about 1000 rpm (for example, 800 to 1500 rpm), and in the stage d), the rotation speed is preferably set to 5000 to 8000 rpm.

As a result, the shaft portion 231 of the connecting element 230 penetrates the second steel member 220 and is friction-welded to the first steel member 210 at the bottom surface. Furthermore, the shaft portion 231 and the second steel member 220 are also friction-welded to each other.

As described above, even in a case where a steel sheet is used as the second steel member 220, the connecting element 230 penetrates the second steel member 220 and the connecting element 230 and the first steel member 210 are joined by friction welding, and the connecting element 230 and the second steel member 220 are also friction-welded to each other. Therefore, even in a case where the connecting element 230 having no head portion 232 is used, joining of the second steel member 220 and the first steel member 210 can be achieved. In a case where the connecting element 230 has the head portion 232, the second steel member 220 is further fixed between the head portion 232 and the first steel member 210, and the second steel member 220 and the first steel member 210 are firmly integrated by the connecting element 230. In a case where a cross section including the axis c of the shaft portion 231 is cut and etched with nital, the boundary between the second steel member 220 and the first steel member 210 is present up to a position 0.20 mm away from the shaft portion.

(Heating of Second Steel Member)

When the connecting element 230 is press-fitted into the second steel member 220, at least the point to be joined of the second steel member 220 and the periphery thereof are heated in advance to reduce the strength of the second steel member 220, so that the connecting element 230 can penetrate the second steel member 220 without being deformed. The time when the second steel member 220 is heated can be either before the second steel member 220 is set in the joining apparatus, or after the steel members to be joined are set in the joining apparatus as described with reference to FIG. 19.

The heating range can be the entire steel member or a partial portion around the joint point. However, after the second steel member 220 is preheated, the heated portion is cooled by heat conduction to an unheated region. Therefore, it is preferable to heat not only the plastic flow region near the connecting element 230 but also the peripheral region. In the case of heating the partial portion, particularly in a case where a steel sheet having a tensile strength of 400 MPa or more is used as the second steel member 220, according to an experiment conducted by the present inventors, it is confirmed that a range of preferably at least three times, and more preferably seven times the diameter of the shaft portion of the connecting element 230 around the point on the second steel member 220 coincident with the center of the connecting element 230 is heated to a desired temperature.

(Preheating Temperature During Heating)

The second steel member 220 needs to be heated to a temperature or higher at which the material of the second steel member 220 that is brought into contact with the connecting element 230 when the connecting element 230 is pressed in causes plastic flow. In the experiment by the present inventors, it was confirmed that when the surface temperature of the second steel member 220 is 400° C. or higher immediately before processing, even in a case where a steel sheet is used as the second steel member 220, the connecting element 230 can penetrate the second steel member 220. As the actual heating temperature, a temperature at which a joint having a necessary joint strength is obtained is selected from the range of 400° C. or higher depending on the strength and sheet thickness of the steel sheet used as the second steel member 220 and the processing conditions (rotation speed, welding pressure, and press-in speed of the connecting element holder). The upper limit of the preheating temperature does not need to be particularly set, but is preferably set to the Ac1 temperature or lower. If necessary, the upper limit of the preheating temperature may be set to 750° C., 700° C., or 650° C.

(Heating Unit)

As a heating unit for heating the second steel member 220, heating units such as a furnace, a gas burner, an electric heater, induction heating, energization heating, or a laser can be used as appropriate. By these heating units, at least the heating range of the side of the second steel member 220 facing the connecting element is heated.

In the joining method according to the present embodiment, the preheating temperature may be 550° C. or higher. Accordingly, the second steel member 220 is further softened, so that the welding pressure of the connecting element 230 can be reduced, which is particularly preferable in a case where the second steel member 220 is a high strength steel sheet.

In a case where the second steel member 220 is preheated, Dmax1 and Dmax2 described in the above embodiment can be increased. For example, in a case where the preheating temperature is set to 400° C. or higher, Dmax1 can be 0.50 times Dmin or more, and Dmax2 can be 1.20 times Dmin or more. When the preheating temperature is 550° C. or higher, Dmax1 can be more stably 0.65 times Dmin or more, and a good result can be obtained in the chisel test. When the preheating temperature is 600° C. or higher, Dmax1 can be more stably 0.70 times Dmin or more, and the result of the chisel test is even better.

The point to be joined and the vicinity thereof, which is the heating range, may be within a range of the diameter of the connecting element 230+about 10 mm when viewed along the axial center c direction of the connecting element 230.

In the above joining method, it is more preferable that the press-in length 1i when the shaft portion 231 is penetrated through the second steel member 220 and the shaft portion 231 is pressed against the first steel member 210 is 2.0 mm or more. The press-in length 1i is more preferably 2.3 mm or more or 2.5 mm or more. By setting the press-in length 1i in this manner, the maximum diameter Dmax2 of the boundary between the shaft portion 231 and the second steel member 220 becomes 1.20 times Dmin or more, which is more preferable.

In addition, it is not easy to measure the actual press-in length of the connecting element 230 against the first steel member 210. Therefore, in the present embodiment, the press-in length 1i is set to a value obtained by subtracting the total thickness of the second steel member 220 from the amount of movement of the connecting element 230 from when the tip end portion of the connecting element 230 reaches the upper surface of the second steel member 220 to the end of joining in the direction along the axis c of the connecting element 230. The amount of movement of the connecting element 230 is the same as the amount of vertical movement of the member that supports the connecting element holder 4 in FIG. 19 and the like, and can be easily measured. The press-in length 1i can also be referred to as an estimated press-in length.

EXAMPLES

Hereinafter, examples of the present invention will be described below. In the present example, various steel members, connecting elements, and manufacturing conditions were examined.

First, various test pieces shown in Table 1 were prepared. Table 1 shows the strength and sheet thickness of the first steel member and the second steel member, and the number of second steel members in each experiment. The steel sheet used was a general steel sheet whose strength was adjusted by the composition and heat treatment.

In addition, Table 1 shows the Fe content (mass %) and the C content (mass %) of the connecting element. In Experiment Nos. 38 and 39, cemented carbide was used as the connecting element. Cemented carbide is a material obtained by sintering a full hard metal carbide and a metal such as cobalt, and the Fe content is less than 90%. In the present example, cemented carbide made of tungsten carbide and cobalt was adopted.

The length of all the connecting elements was set to (total thickness of the second steel members)+5.5 mm.

TABLE 1

| Experiment No. | Second steel member Strength (MPa) | Sheet thickness (mm) | Number of sheets | First steel member Strength (MPa) | Sheet thickness (mm) | Connecting element Fe (mass %) | C (mass %) |
| --- | --- | --- | --- | --- | --- | --- | --- |
| 1 | 980 | 1.6 | 1 | 980 | 1.6 | 96 | 0.21 |
| 2 | 980 | 1.6 | 1 | 980 | 1.6 | 96 | 0.21 |
| 3 | 980 | 1.6 | 1 | 980 | 1.6 | 96 | 0.21 |
| 4 | 980 | 1.6 | 1 | 980 | 1.6 | 96 | 0.21 |
| 5 | 980 | 1.6 | 1 | 980 | 1.6 | 96 | 0.21 |
| 6 | 980 | 1.6 | 1 | 1500 | 1.6 | 96 | 0.21 |
| 7 | 980 | 1.6 | 1 | 1500 | 1.6 | 96 | 0.21 |
| 8 | 980 | 1.6 | 1 | 1500 | 1.6 | 96 | 0.21 |
| 9 | 980 | 1.6 | 1 | 1500 | 1.6 | 96 | 0.21 |
| 10 | 980 | 1.6 | 1 | 1500 | 1.6 | 96 | 0.21 |
| 11 | 980 | 1.6 | 1 | 1500 | 1.6 | 96 | 0.21 |
| 12 | 980 | 1.6 | 1 | 1500 | 1.6 | 96 | 0.21 |
| 13 | 980 | 1.6 | 1 | 590 | 1.2 | 96 | 0.21 |
| 14 | 270 | 1.6 | 1 | 1500 | 1.6 | 96 | 0.21 |
| 15 | 270 | 1.6 | 1 | 1500 | 1.6 | 96 | 0.21 |
| 16 | 590 | 1.2 | 1 | 590 | 1.2 | 96 | 0.21 |
| 17 | 590 | 1.2 | 1 | 590 | 1.2 | 96 | 0.21 |
| 18 | 590 | 1.2 | 1 | 590 | 1.2 | 96 | 0.21 |
| 19 | 590 | 1.2 | 1 | 590 | 1.2 | 96 | 0.21 |
| 20 | 590 | 1.0 | 2 | 590 | 1.2 | 96 | 0.21 |
| 21 | 590 | 2.0 | 2 | 590 | 1.2 | 96 | 0.21 |
| 22 | 590 | 2.0 | 1 | 590 | 2.0 | 97 | 0,44 |
| 23 | 590 | 2.0 | 1 | 590 | 2.0 | 97 | 0.44 |
| 24 | 590 | 1.2 | 1 | 590 | 1.2 | 97 | 0.45 |
| 25 | 590 | 1.2 | 1 | 590 | 1.2 | 97 | 0.45 |
| 26 | 590 | 1.2 | 1 | 980 | 1.6 | 96 | 0.21 |
| 27 | 590 | 1.2 | 1 | 980 | 1.6 | 96 | 0.21 |
| 28 | 590 | 1.2 | 1 | 980 | 1.6 | 96 | 0.21 |
| 29 | 590 | 1.2 | 1 | 980 | 1.6 | 96 | 0.21 |
| 30 | 590 | 1.2 | 1 | 980 | 1.6 | 96 | 0.21 |
| 31 | 590 | 1.2 | 1 | 980 | 1.6 | 96 | 0.21 |
| 32 | 980 | 1.2 | 1 | 980 | 1.6 | 96 | 0.21 |
| 33 | 980 | 1.2 | 1 | 980 | 1.6 | 96 | 0.21 |
| 34 | 980 | 1,2 | 1 | 980 | 1.6 | 96 | 0.21 |
| 35 | 980 | 1.2 | 1 | 980 | 1.6 | 96 | 0.21 |
| 36 | 980 | 1.2 | 1 | 980 | 1.6 | 96 | 0.21 |
| 37 | 980 | 1.2 | 1 | 980 | 1.6 | 96 | 0.21 |
| 38 | 980 | 1.6 | 1 | 980 | 1.6 | Cemented carbide | |
| 39 | 980 | 1.6 | 1 | 980 | 1.6 | Cemented carbide | |
| 40 | 270 | 5.0 | 1 | 980 | 1.6 | 96 | 0.21 |
| 41 | 590 | 1.2 | 1 | 270 | 1.6 | 96 | 0.21 |

Next, the first steel member and the second steel member in each experiment number in Table 1 were overlapped with each other, and subjected to friction welding using the connecting element in each experiment number in Table 1. In some experimental examples, the through-hole was provided in the second steel member, and friction welding was performed so that the connecting element was inserted into the through-hole. In addition, in some experimental examples, the point to be joined of the second steel member was heated.

In the present example, friction welding was performed using the apparatus described in [Joining Method 1] and [Joining Method 2] of the above embodiment. The conditions for the penetrating of the second steel member were a rotation speed of 1000 rpm and a welding pressure of 9 kN. The conditions for friction welding of the connecting element and the first steel member were a rotation speed of 7000 rpm and a welding pressure of 9 kN, and the press-in length used was different for each experimental example. In Experiment Nos. 38 and 39 using cemented carbide as the connecting element, the conditions of friction stir spot welding were a rotation speed of 1000 rpm, a press-in length of 1 mm (press-in length from the upper surface of the first steel member), and a joining time of four seconds. The shaft portion of the connecting element used in Experiment Nos. 38 and 39 had a cylindrical shape with no change in diameter.

Table 2 shows the diameter D of the shaft portion of the connecting element, the diameter Dp of the through-hole of the second steel member, the ratio (Dp/D), the preheating temperature of the second steel member, and the press-in length. In Table 2, the symbol "-" was entered in the experimental example in which no through-hole was provided and in the experimental example in which the second steel member was not preheated.

The diameter D of the shaft portion of the connecting element was the same in the direction along the axis of the shaft portion. The through-hole of the second steel member was circular.

The preheating temperature of the second steel member was obtained by measuring the surface temperature with a thermocouple.

TABLE 2

| Experiment No. | Diameter D of shaft portion (mm) | Diameter Dp of through-hole of second steel member (mm) | Dp/D | Preheating temperature of second steel member (° C.) | Press-in length li (mm) |
|---|---|---|---|---|---|
| 1 | 4.55 | 2.0 | 0.44 | — | 2.3 |
| 2 | 4.55 | 4.5 | 0.99 | — | 2.3 |
| 3 | 4.55 | 4.8 | 1.05 | — | 2.3 |
| 4 | 4.55 | 5.0 | 1.10 | — | 2.3 |
| 5 | 4.55 | 6.0 | 1.32 | — | 2.3 |
| 6 | 4.55 | 2.0 | 0.44 | — | 2.3 |
| 7 | 4.55 | 4.5 | 0.99 | — | 2.3 |
| 8 | 4.55 | 5.0 | 1.10 | — | 2.3 |
| 9 | 4.55 | 5.0 | 1.10 | — | 0.8 |
| 10 | 4.55 | 5.0 | 1.10 | — | 1.0 |
| 11 | 4.55 | 5.2 | 1.14 | — | 2.5 |
| 12 | 4.55 | 9.0 | 1.98 | — | 2.3 |
| 13 | 4.55 | 5.2 | 1.14 | — | 2.3 |
| 14 | 4.55 | 2.8 | 0.62 | — | 2.4 |
| 15 | 4.55 | 9.0 | 1.98 | — | 2.4 |
| 16 | 4.55 | 2.0 | 0.44 | — | 2.0 |
| 17 | 4.55 | 2.8 | 0.62 | — | 2.0 |
| 18 | 4.55 | 5.0 | 1.10 | — | 2.0 |
| 19 | 4.55 | 7.0 | 1.54 | — | 2.0 |
| 20 | 4.55 | 5.2 | 1.14 | — | 2.8 |
| 21 | 4.55 | 5.2 | 1.14 | — | 3.3 |
| 22 | 6.00 | 5.2 | 0.87 | — | 2.3 |
| 23 | 6.00 | 6.5 | 1.08 | — | 2.3 |
| 24 | 4.00 | 3.5 | 0.88 | — | 2.5 |
| 25 | 4.00 | 4.5 | 1.13 | — | 2.5 |
| 26 | 4.55 | — | — | 100 | 2.5 |
| 27 | 4.55 | — | — | 200 | 2.5 |
| 28 | 4.55 | — | — | 400 | 2.5 |
| 29 | 4.55 | — | — | 500 | 2.5 |
| 30 | 4.55 | — | — | 600 | 2.5 |
| 31 | 4.55 | — | — | — | 2.5 |
| 32 | 4.55 | — | — | 100 | 2.5 |
| 33 | 4.55 | — | — | 200 | 2.5 |
| 34 | 4.55 | — | — | 400 | 2.5 |
| 35 | 4.55 | — | — | 500 | 2.5 |
| 36 | 4.55 | — | — | 600 | 2.5 |
| 37 | 4.55 | — | — | — | 2.5 |
| 38 | 4.00 | — | — | — | 1.0 |
| 39 | 4.00 | 3.0 | 0.75 | — | 1.0 |
| 40 | 4.55 | 5.0 | 1.10 | — | 3.5 |
| 41 | 4.55 | 5.0 | 1.10 | — | 2.0 |

For the joint structure of each experimental example obtained by the above steps, the joint diameter between the second steel member and the connecting element and the joint diameter between the first steel member and the connecting element were examined. In addition, the fixed state of the second steel member and the result of the chisel test were evaluated.

Table 3 shows the joint diameter between the second steel member and the connecting element, the joint diameter between the first steel member and the connecting element, the fixed state of the second steel member, and the result of the chisel test.

TABLE 3

| Experiment No. | Joint diameter between second steel member and connecting element (Dmax2)/(Dmin) | Joint diameter between first steel member and connecting element (Dmax1)/(Dmin) | Fixed state of second steel member | Result of chisel test | Note |
|---|---|---|---|---|---|
| 1 | 1.31 | — | bad | — | Comparative Example |
| 2 | 1.21 | 0.65 | good | good | Example |
| 3 | 1.22 | 0.94 | good | very good | Example |
| 4 | 1.25 | 1.01 | good | very good | Example |
| 5 | — | 1.21 | bad | very good | Comparative Example |

TABLE 3-continued

| Experiment No. | Joint diameter between second steel member and connecting element (Dmax2)/(Dmin) | Joint diameter between first steel member and connecting element (Dmax1)/(Dmin) | Fixed state of second steel member | Result of chisel test | Note |
|---|---|---|---|---|---|
| 6 | 1.30 | — | bad | — | Comparative Example |
| 7 | 1.23 | 0.68 | good | good | Example |
| 8 | 1.22 | 0.93 | good | very good | Example |
| 9 | 1.10 | 0.93 | bad | very good | Comparative Example |
| 10 | 1.10 | 0.97 | bad | very good | Comparative Example |
| 11 | 1.22 | 1.06 | good | very good | Example |
| 12 | — | 1.23 | bad | very good | Comparative Example |
| 13 | 1.24 | 1.06 | good | very good | Example |
| 14 | 1.29 | 0.66 | good | good | Example |
| 15 | — | 1.22 | bad | very good | Comparative Example |
| 16 | 1.31 | — | bad | — | Comparative Example |
| 17 | 1.25 | 0.66 | good | good | Example |
| 18 | 1.24 | 0.98 | good | very good | Example |
| 19 | — | 1.24 | bad | very good | Comparative Example |
| 20 | 1.23 | 1.09 | good | very good | Example |
| 21 | 1.21 | 1.10 | good | very good | Example |
| 22 | 1.25 | 0.69 | good | good | Example |
| 23 | 1.26 | 0.95 | good | very good | Example |
| 24 | 1.21 | 0.65 | good | good | Example |
| 25 | 1.20 | 0.99 | good | very good | Example |
| 26 | 1.31 | — | bad | — | Comparative Example |
| 27 | 1.23 | — | bad | bad | Comparative Example |
| 28 | 1.29 | 0.56 | good | good | Example |
| 29 | 1.28 | 0.61 | good | good | Example |
| 30 | 1.26 | 0.78 | good | good | Example |
| 31 | 1.30 | — | bad | — | Comparative Example |
| 32 | 1.28 | — | bad | — | Comparative Example |
| 33 | 1.29 | — | bad | — | Comparative Example |
| 34 | 1.26 | 0.55 | good | good | Example |
| 35 | 1.30 | 0.60 | good | good | Example |
| 36 | 1.27 | 0.76 | good | good | Example |
| 37 | 1.34 | — | bad | — | Comparative Example |
| 38 | 1.00 | 1.00 | good | — | Comparative Example |
| 39 | 1.00 | 1.00 | good | — | Comparative Example |
| 40 | 1.25 | 1.09 | good | very good | Example |
| 41 | 1.23 | 1.10 | good | very good | Example |

The joint diameter between the second steel member and the connecting element and the joint diameter between the first steel member and the connecting element were measured by observing a cross section parallel to the axis of the connecting element. Specifically, the joint structure including the first steel member, the second steel member, and the connecting element was cut along a plane passing through the axis of the connecting element, polished, and etched with nital. The surface was photographed using an optical microscope, and each joint diameter was calculated from the photographed image.

Here, Dmax1, Dmax2, and Dmin were calculated by the method illustrated in FIGS. 12 and 13 described in the above embodiment.

In Table 3, the symbol "-" was entered in the experimental examples in which the second steel member and the connecting element were not joined or the first steel member and the connecting element were not joined. In Experiment Nos. 9 and 10, the plastic deformation of the connecting element was insufficient, and the connecting element and the second steel member were not joined.

In Experiment Nos. 38 and 39, although the tool for friction stir welding and the first steel member, and the tool and the second steel member were not joined, the maximum diameter of the point where the tool and the first steel member were in contact was used as Dmax1, and the maximum diameter of the point where the tool and the second steel member were in contact was used as Dmax2.

The fixed state of the second steel member was evaluated as "bad" for those in which the first steel member and the connecting element were not joined, those in which the first steel member was fixed and the second steel member was rotated when the second steel member was held by pliers and a force was applied by hand in the direction in which the second steel member rotated, or those in which the first steel member and the connecting element were peeled off from each other, and evaluated as "good" for those in which the second steel member was not rotated.

In the chisel test, a chisel was inserted between the first steel member and the second steel member with a hammer for evaluation until the first steel member and the connecting element were fractured, or the second connecting element was fractured. In a case where the second steel member and the connecting element were not joined, the connecting element was directly hit until the connecting element and the first steel member were fractured.

Figure 24:
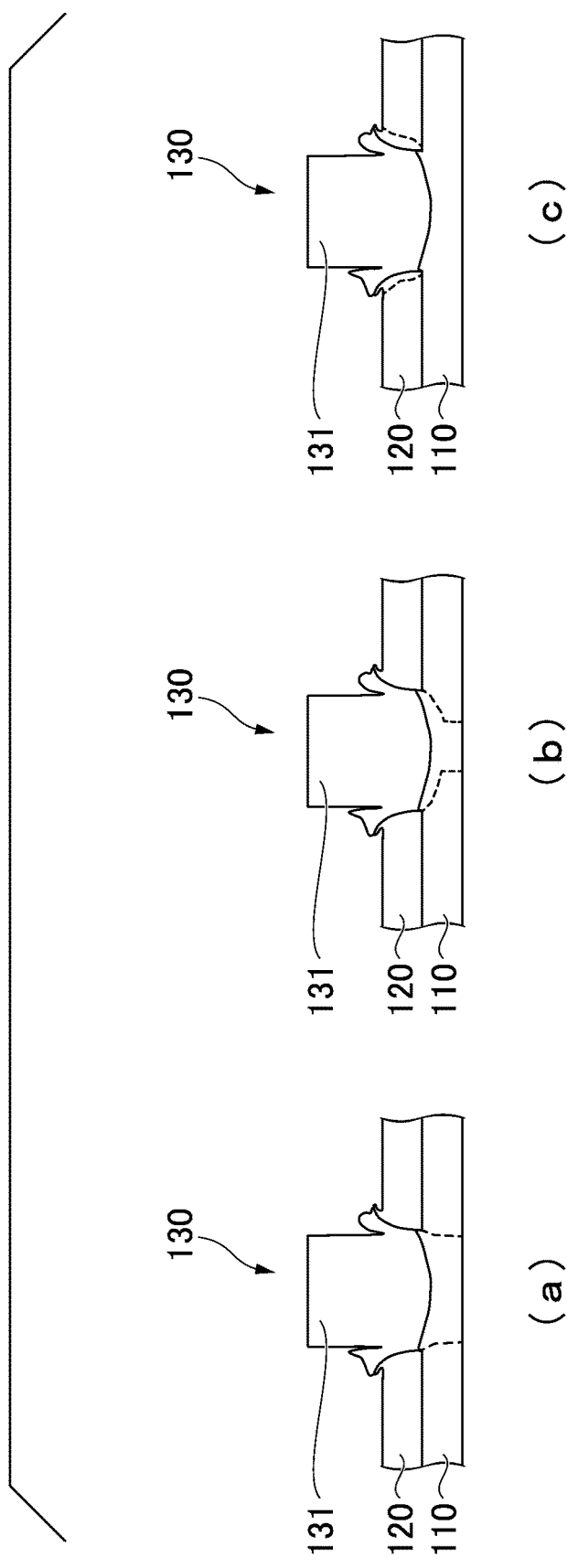
FIG. 24 is a cross-sectional view for describing the evaluation of a chisel test.
Figure 25:
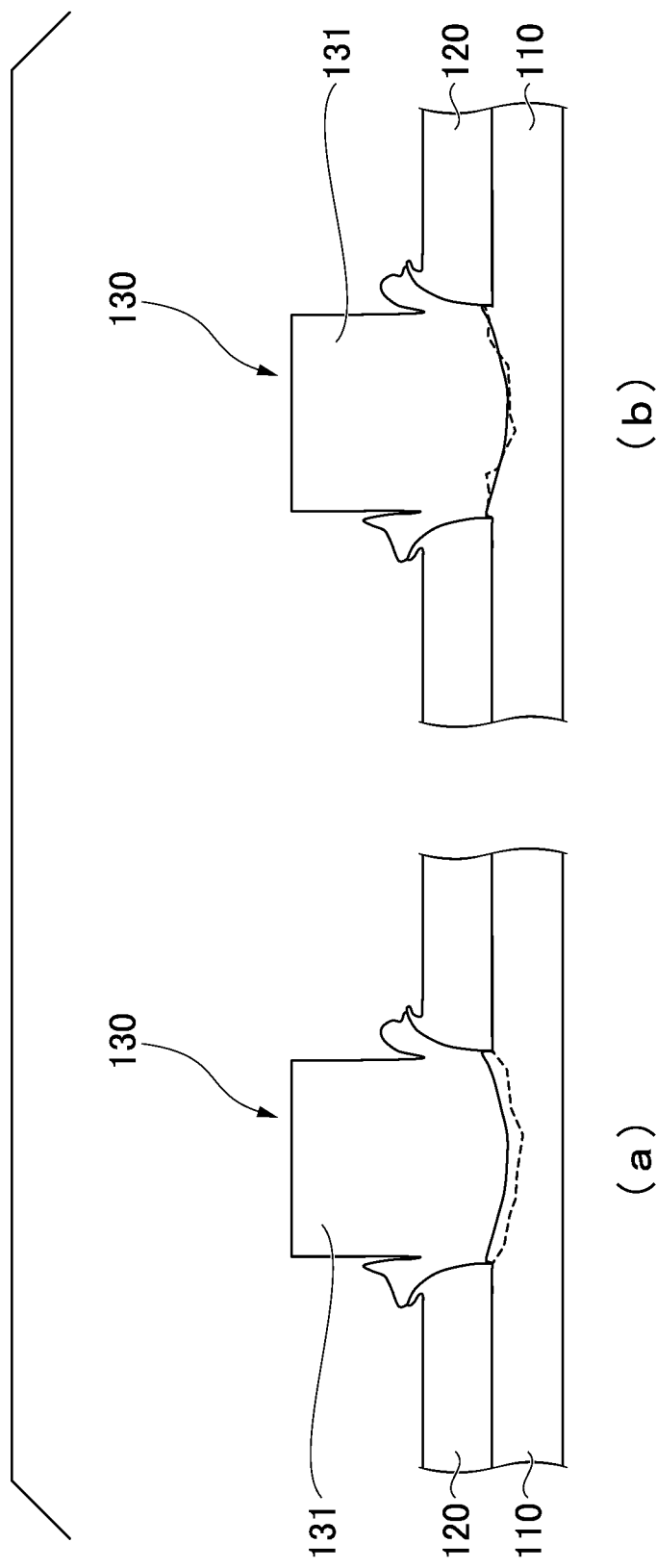
FIG. 25 is a cross-sectional view for describing the evaluation of the chisel test.

In the evaluation of "Result of chisel test" in Table 3, as illustrated in FIG. 24, plug fracture ((a) of FIG. 24), partial plug fracture ((b) of FIG. 24), or experimental examples in which parts other than the interface between the second steel member and the connecting element were fractured ((c) of FIG. 24) were evaluated as "very good". The dotted line in FIG. 24 indicates the fracture point. As illustrated in FIG. 25 ((a) and (b) of FIG. 25), experimental examples in which at least a part of the first steel member or the inside of the connecting element was fractured instead of the joint interface was evaluated as "good". The dotted line in FIG. 25 indicates the fracture point. An experimental example in which the entire joint interface was peeled off was evaluated as "bad". The experimental example in which the first steel member and the connecting element were not joined was marked "-".

Experiment Nos. 38 and 39 are comparative examples in which the joint structure was obtained by friction stir spot welding. In Experiment Nos. 38 and 39, the tool (connecting element) and the first and second steel members were not joined, but the first and second steel members were directly joined to each other. Therefore, even in the cross-section observation, the interface between the first steel member and the second steel member was not observed at the position of 0.20 mm from the tool end. Since the tool (connecting element) did not deform, in Table 3, (Dmax2)/(Dmin)=1.00 and (Dmax1)/(Dmin)=1.00 were described.

In the experimental examples of Experiment Nos. 1, 5, 6, 9, 10, 12, 15, 16, 19, 26, 27, 31, 32, 33, 37, 38, and 39, the connecting element and any of the first and second steel members were not joined to each other.

INDUSTRIAL APPLICABILITY

The present invention can provide a joint structure and a joining method capable of stably joining a plurality of steel members, and a vehicle member having the joint structure, and thus has high industrial applicability.

The invention claimed is:

1. A joint structure which joins a plurality of overlapped steel members using a connecting element having a shaft portion, the joint structure comprising:
a first steel member; and
one or more of second steel members overlapping the first steel member,
wherein the shaft portion of the connecting element is penetrated through the second steel member, and the shaft portion of the connecting element and the second steel member are joined by friction welding,
the shaft portion and the first steel member are joined by friction welding,
a diameter of a part of the shaft portion of the connecting element is the same in a direction along an axis of the shaft portion, and
in a case where a maximum diameter of a boundary between the shaft portion and the second steel member is denoted by Dmax2, and a minimum diameter of the shaft portion at a portion more distant from the second steel member than a measurement position of the Dmax2 is denoted by Dmin, the Dmax2 is 1.20 times the Dmin or more,
wherein the part of the shaft portion of the connecting element that is contiguous to the boundary between the shaft portion and the second steel member has the minimum diameter of Dmin.

2. The joint structure according to claim 1, wherein in a case where a maximum diameter of a boundary between the shaft portion and the first steel member is denoted by Dmax1, and the Dmax1 is 0.65 times the Dmin or more.

3. The joint structure according to claim 2, wherein the Dmax1 is 0.92 times the Dmin or more.

4. The joint structure according to claim 2, wherein the Dmin is 3.0 to 10.0 mm.

5. The joint structure according to claim 1, wherein a total thickness of the second steel member is 1.0 to 5.0 mm.

6. The joint structure according to claim 1, wherein the first steel member and the second steel member have a tensile strength of 590 MPa or more.

7. The joint structure according to claim 1, wherein the connecting element contains, as a chemical composition, by mass %:
C: 0.10% or more; and
Fe: 90% or more.

8. The joint structure according to claim 1, wherein, in the connecting element, an end portion of the shaft portion which is not friction-welded to the first steel member is provided with a head portion having a diameter larger than a diameter of the shaft portion.

9. A joining method for obtaining the joint structure according to claim 1, the joining method comprising:
preparing the first steel member and one or more of the second steel members in which a through-hole having a diameter of more than 0.60 times and not more than 1.15 times a diameter of the shaft portion is formed;
overlapping the first steel member and the second steel member so that the through-hole overlaps a point to be joined of the first steel member;
inserting the shaft portion into the through-hole, and pressing the shaft portion against the first steel member while rotating the connecting element to generate frictional heat between the shaft portion and the through-hole, and between the shaft portion and the first steel member; and
pressing the shaft portion against the first steel member in a state where the rotation of the connecting element is stopped to join the shaft portion and the through-hole, and the shaft portion and the first steel member by friction welding.

10. The joining method according to claim 9, wherein the diameter of the through-hole is more than 1.00 times and not more than 1.15 times the diameter of the shaft portion.

11. The joining method according to claim 9, wherein, in the pressing of the connecting element against the first steel member while rotating the connecting element to generate frictional heat between the shaft portion and the first steel member, and between the shaft portion and the second steel member, a press-in length of the connecting element against the first steel member is 2.0 mm or more.

12. A joining method for obtaining the joint structure according to claim 1, the joining method comprising:
- overlapping the first steel member and one or more of the second steel members so that a point to be joined of the first steel member overlaps a point to be joined of the second steel member;
- heating at least the point to be joined of the second steel member and a vicinity thereof to a preheating temperature of 400° C. or higher;
- pressing the shaft portion against the second steel member while rotating the connecting element so that the shaft portion penetrates the second steel member;
- pressing the shaft portion against the first steel member while rotating the connecting element to generate frictional heat between the shaft portion and the first steel member, and between the shaft portion and the second steel member; and
- pressing the shaft portion against the first steel member in a state where the rotation of the connecting element is stopped to join the shaft portion and the first steel member, and the shaft portion and the second steel member by friction welding.

13. The joining method according to claim 12, wherein the preheating temperature is 550° C. or higher.

* * * * *